(12) United States Patent
Park et al.

(10) Patent No.: US 10,819,992 B2
(45) Date of Patent: *Oct. 27, 2020

(54) METHODS AND APPARATUSES FOR PERFORMING ENCODING AND DECODING ON IMAGE

(71) Applicant: SAMSUNG ELECTRONICS CO., LTD., Suwon-si (KR)

(72) Inventors: Pilkyu Park, Suwon-si (KR); Youngo Park, Suwon-si (KR); Jongseok Lee, Suwon-si (KR); Yumi Sohn, Suwon-si (KR); Myungjin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,613

(22) Filed: Jan. 15, 2020

(65) Prior Publication Data

US 2020/0177898 A1    Jun. 4, 2020

Related U.S. Application Data

(63) Continuation of application No. PCT/KR2019/013344, filed on Oct. 11, 2019.

(30) Foreign Application Priority Data

Oct. 19, 2018  (KR) .......................... 10-2018-0125406
Apr. 8, 2019   (KR) .......................... 10-2019-0041111
Jun. 26, 2019  (KR) .......................... 10-2019-0076569

(51) Int. Cl.
*H04N 19/132*    (2014.01)
*H04N 19/146*    (2014.01)
(Continued)

(52) U.S. Cl.
CPC ........... *H04N 19/30* (2014.11); *H04N 19/146* (2014.11); *H04N 19/172* (2014.11); *H04N 19/42* (2014.11); *H04N 19/70* (2014.11)

(58) Field of Classification Search
None
See application file for complete search history.

(56) References Cited

U.S. PATENT DOCUMENTS 7,308,031 B2   12/2007  Yamaguchi et al.
7,400,588 B2   7/2008   Izzat et al.
(Continued)

FOREIGN PATENT DOCUMENTS

JP    2008-527810 A    7/2008
JP    2012-191250 A    10/2012
(Continued)

OTHER PUBLICATIONS

Communication (PCT/ISA/220, PCT/ISA/210 & PCT/ISA/237) dated Jan. 23, 2020 by the International Searching Authority in counterpart International Patent Application No. PCT/KR2019/012836.

(Continued)

*Primary Examiner* — Soo Shin
(74) *Attorney, Agent, or Firm* — Sughrue Mion, PLLC

(57) ABSTRACT

Provided is a computer-recordable recording medium having stored thereon a video file including artificial intelligence (AI) encoding data, wherein the AI encoding data includes: image data including encoding information of a low resolution image generated by AI down-scaling a high resolution image; and AI data about AI up-scaling of the low resolution image reconstructed according to the image data, wherein the AI data includes: AI target data indicating whether AI up-scaling is to be applied to at least one frame; and AI supplementary data about up-scaling deep neural (Continued)

network (DNN) information used for AI up-scaling of the at least one frame from among a plurality of pieces of pre-set default DNN configuration information, when AI up-scaling is applied to the at least one frame.

15 Claims, 29 Drawing Sheets

(51) Int. Cl.
| | |
|---|---|
| *H04N 19/172* | (2014.01) |
| *H04N 19/182* | (2014.01) |
| *H04N 19/30* | (2014.01) |
| *H04N 19/42* | (2014.01) |
| *H04N 19/59* | (2014.01) |
| *H04N 19/70* | (2014.01) |
| *H04N 19/85* | (2014.01) |

(56) References Cited

U.S. PATENT DOCUMENTS

| | | | |
|---|---|---|---|
| 8,184,164 | B2 | 5/2012 | Yang et al. |
| 9,251,572 | B2 | 2/2016 | Shu et al. |
| 9,679,213 | B2 | 6/2017 | Yang et al. |
| 10,148,723 | B2 | 12/2018 | Falvo |
| 10,218,971 | B2 | 2/2019 | Dong et al. |
| 10,423,843 | B2 * | 9/2019 | Biemer .............. G06K 9/00818 |
| 2007/0189392 | A1 | 8/2007 | Tourapis et al. |
| 2012/0230604 | A1 | 9/2012 | Yamajo et al. |
| 2014/0177706 | A1 | 6/2014 | Fernandes et al. |
| 2015/0256828 | A1 | 9/2015 | Dong et al. |
| 2017/0208345 | A1 | 7/2017 | Jeong et al. |
| 2017/0287109 | A1 | 10/2017 | Tasfi |
| 2017/0347061 | A1 * | 11/2017 | Wang ....................... G06K 9/46 |
| 2018/0107925 | A1 | 4/2018 | Choi et al. |
| 2018/0139458 | A1 * | 5/2018 | Wang ................... H04N 19/154 |
| 2018/0174275 | A1 | 6/2018 | Bourdev et al. |
| 2018/0176570 | A1 | 6/2018 | Rippel et al. |
| 2018/0249158 | A1 | 8/2018 | Huang et al. |
| 2018/0288440 | A1 | 10/2018 | Chao |
| 2018/0293706 | A1 | 10/2018 | Viswanathan et al. |
| 2018/0302456 | A1 | 10/2018 | Katsavounidis et al. |
| 2019/0013822 | A1 | 1/2019 | Marpe et al. |
| 2019/0230354 | A1 | 7/2019 | Kim |

FOREIGN PATENT DOCUMENTS

| | | | |
|---|---|---|---|
| KR | 10-0224801 | B1 | 10/1999 |
| KR | 10-0286443 | B1 | 4/2001 |
| KR | 10-2014-0145560 | A | 12/2014 |
| KR | 10-2016-0036662 | A | 4/2016 |
| KR | 10-2016-0080929 | A | 7/2016 |
| KR | 10-2017-0059040 | A | 5/2017 |
| KR | 10-2017-0100045 | A | 9/2017 |
| KR | 10-2018-0001428 | A | 1/2018 |
| KR | 10-2018-0043154 | A | 4/2018 |
| KR | 10-2018-0052651 | A | 5/2018 |
| KR | 10-1885855 | B1 | 8/2018 |
| KR | 10-2018-0100976 | A | 9/2018 |
| KR | 10-2018-0108288 | A | 10/2018 |
| WO | 2017/036370 | A1 | 3/2017 |
| WO | 2018/143992 | A1 | 8/2018 |

OTHER PUBLICATIONS

Communication (PCT/ISA/220, PCT/ISA/210 & PCT/ISA/237) dated Jan. 29, 2020 by the International Searching Authority in counterpart International Patent Application No. PCT/KR2019/013595.

Communication (PCT/ISA/220, PCT/ISA/210 & PCT/ISA/237) dated Jan. 30, 2020 by the International Searching Authority in counterpart International Patent Application No. PCT/KR2019/013421.

Communication (PCT/ISA/220, PCT/ISA/210 & PCT/ISA/237) dated Feb. 5, 2020 by the International Searching Authority in counterpart International Patent Application No. PCT/KR2019/013483.

Communication (PCT/ISA/220, PCT/ISA/210 & PCT/ISA/237) dated Feb. 21, 2020 by the International Searching Authority in counterpart International Patent Application No. PCT/KR2019/013733.

Jeong, Woojin et al., "Efficient Super-Resolution Method for Single Image based on Deep Neural Networks", Journal of The Institute of Electronics and Information Engineers, vol. 55, No. 6, pp. 779-786, Jun. 2018. (10 pages total).

Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).

Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).

Search Report and Written Opinion dated Dec. 4, 2019, issued by the International Searching Authority in International Application No. PCT/KR2019/010645 (PCT/ISA/210 & PCT/ISA/237).

Rastegari, M., et al., "XNOR-Net: ImageNet Classification Using Binary Convolutional Neural Networks", 2016, 17 pages total.

Courbariaux, M., et al., "BinaryConnect: Training Deep Neural Networks with binary weights during propagations", Apr. 18, 2016, 9 pages total.

Ki, Sehwan et al., "A Study on the Convolution Neural Network based on Blind High Dynamic Range Image Quality Assessment", Proceedings of Symposium of the Korean Institute of Communications and Information Sciences, 2018, pp. 1529-1530. (4 pages total).

Le Callet, Patrick et al., "A Convolutional Neural Network Approach for Objective Video Quality Assessment", IEEE Transactions on Neural Networks, vol. 17, No. 5, Sep. 2006, pp. 1316-1327. (14 pages total).

Giannaopoulos, Michalis et al., "Convolutional Neural Networks for Video Quality Assessment", arXiv:1809.10117v1, [eess.IV], Sep. 26, 2018, pp. 1-12. (14 pages total).

PCT/ISA/210 & PCT/ISA/237 issued Aug. 6, 2019 by the International Searching Authority in counterpart International Patent Application No. PCT/KR2019/004171.

PCT/ISA/210 & PCT/ISA/237 issued Jan. 7, 2020 by the International Searching Authority in counterpart International Patent Application No. PCT/KR2019/012510.

PCT/ISA/210 & PCT/ISA/237 issued Jan. 22, 2020 by the International Searching Authority in counterpart International Patent Application No. PCT/KR2019/013344.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

| ai_codec_usage_main(payloadSize) { | Descriptor |
|---|---|
| ai_codec_info { | ue(v) |
| if(ai_codec_info) { | |
| ai_codec_applied_channel_info | ue(v) |
| target_bitrate | ue(v) |
| pic_width_in_org_luma_samples | ue(v) |
| pic_height_in_org_luma_samples | ue(v) |
| ai_codec_DNN_info | ue(v) |
| ai_codec_supplementary_info_flag | u(1) |
| if(ai_codec_supplementary_info_flag) { | |
| genre_info | ue(v) |
| hdr_max_luminance | ue(v) |
| hdr_color_gamut | ue(v) |
| hdr_pq_type | ue(v) |
| rate_control_type | ue(v) |
| codec_type | ue(v) |
| } | |
| } | |
| } | |

FIG. 21

| ai_codec_usage_main(payloadSize) { | Descriptor |
|---|---|
|   ai_codec_frame_info | ue(v) |
|   if (ai_codec_frame_info) { | |
|     ai_codec_frame_DNN_info | ue(v) |
|     ai_codec_enhancement_flag | ue(1) |
|     if(ai_codec_enhancement_flag) { | |
|       encod_param_type | ue(v) |
|       encod_param_map | ue(v) |
|     } | |
|     ai_codec_artifact_removal_flag { | u(1) |
|     if(ai_codec_artifact_removal_flag) { | |
|       num_artifact_type | ue(v) |
|       for(i=0; i<num_artifact_type; i++) { | |
|         artifact_type | ue(v) |
|         num_artifact_map | ue(v) |
|         for(i=0; i<num_artifact_map; i++) { | |
|           map_x_pos | ue(v) |
|           map_x_pos | ue(v) |
|           map_width | ue(v) |
|           map_height | ue(v) |
|         } | |
|       } | |
|     } | |
|   } | |
| } | |

METHODS AND APPARATUSES FOR PERFORMING ENCODING AND DECODING ON IMAGE

TECHNICAL FIELD

The disclosure relates to an image processing field. More particularly, the disclosure relates to methods and apparatuses for encoding and decoding an image based on Deep Neural Network.

BACKGROUND ART

An image is stored in a recording medium or transmitted via a communication channel in a form of a bitstream after being encoded via a codec following a certain data compression standard, such as the Moving Picture Expert Group (MPEG) standard.

With the development and supply of hardware capable of reproducing and storing a high resolution and high quality image, the need for a codec capable of effectively encoding and decoding the high resolution and high quality image has increased.

DESCRIPTION OF EMBODIMENTS

Technical Problem

According to an aspect of the present invention, there is provided a method and apparatus for encoding and decoding an image, which uses a deep neural network (DNN) to encode and decode an image at a low bit rate.

In addition, a computer-readable recording medium recording a program for executing the image encoding method and the image decoding method in a computer according to an embodiment of the present disclosure is disclosed.

Solution to Problem

In the disclosure, a computer-recordable recording medium has stored thereon a video file including artificial intelligence (AI) encoding data, wherein the AI encoding data includes: image data including encoding information of a low resolution image generated by AI down-scaling a high resolution image; and AI data about AI up-scaling of the low resolution image reconstructed according to the image data, wherein the AI data includes: AI target data indicating whether AI up-scaling is to be applied to at least one frame; and AI supplementary data about up-scaling deep neural network (DNN) information used for AI up-scaling of the at least one frame from among a plurality of pieces of pre-set default DNN configuration information, when AI up-scaling is applied to the at least one frame.

According to another embodiment of the disclosure, a video decoding method using artificial intelligence (AI) up-scaling includes: receiving a video file including AI encoding data that includes image data and AI data about AI up-scaling of the image data; obtaining the AI data of the AI encoding data from a metadata box of the video file and obtaining the image data of the AI encoding data from a media data box of the video file; reconstructing a low resolution image of a current frame by decoding the image data; obtaining up-scaling deep neural network (DNN) information of the current frame from the AI data; and generating a high resolution image corresponding to the low resolution image by AI up-scaling the low resolution image according to the up-scaling DNN information of the current frame.

According to another embodiment of the disclosure, a video encoding method using an artificial intelligence (AI) down-scaling includes: determining down-scaling deep neural network (DNN) information for AI down-scaling a high resolution image of a current frame to a low resolution image; generating the low resolution image of the current frame by AI down-scaling the high resolution image of the current frame, according to the down-scaling DNN information; generating AI data about up-scaling DNN information corresponding to the down-scaling DNN information, the up-scaling DNN information used to AI up-scale the low resolution image of the current frame; obtaining image data by encoding the low resolution image of the current frame; generating AI encoding data including the image data and the AI data; and outputting a video file including media data box in which the image data of the AI encoding data is embedded and a metadata box in which the AI data of the AI encoding data is embedded.

According to another embodiment of the disclosure, a video decoding apparatus performing a video decoding method using artificial intelligence (AI) up-scaling is provided. The video decoding apparatus includes: a communicator configured to receive a video file including AI encoding data that includes image data and AI data about AI up-scaling of the image data; a parser configured to obtain the AI data of the AI encoding data from a metadata box of the video file and obtain the image data of the AI encoding data from a media data box of the video file; a first decoder configured to reconstruct a low resolution image of a current frame by decoding the image data; and an AI up-scaler configured to obtain up-scaling deep neural network (DNN) information of the current frame from the AI data, and generate a high resolution image corresponding to the low resolution image by AI up-scaling the low resolution image according to the up-scaling DNN information of the current frame.

According to another embodiment of the disclosure, a video encoding apparatus performing a video encoding method using artificial intelligence (AI) down-scaling is provided. The video encoding apparatus includes: an AI down-scaler configured to determine down-scaling deep neural network (DNN) information for AI down-scaling a high resolution image of a current frame to a low resolution image, generate the low resolution image of the current frame by AI down-scaling the high resolution image of the current frame, and generate AI data used to AI up-scale the low resolution image of the current frame; a first encoder configured to determine image data by encoding the low resolution image of the current frame; a data processor configured to determine AI encoding data including the image data and the AI data; and a communicator configured to output a video file including a media data box in which the image data of the AI encoding data is embedded and a metadata box in which the AI data of the AI encoding data is embedded.

The technical problems of the disclosure are not limited to the aforementioned technical features, and other unstated technical problems may be inferred from embodiments below.

Advantageous Effects of Disclosure

According to artificial intelligence (AI) encoding and AI decoding methods and apparatuses according to embodiments, an image may be processed with a low bitrate via AI-based image encoding and decoding.

BRIEF DESCRIPTION OF DRAWINGS

A brief description of each drawing is provided to more fully understand the drawing recited in the present specification.

FIG. 5 is a table showing a mapping relationship between several pieces of image-related information and several pieces of DNN setting information.

FIG. 19 illustrates a syntax table in which the data structure of FIG. 18A is implemented.

FIG. 21 illustrates a syntax table in which the data structure of FIG. 20 is implemented.

BEST MODE

Figure 1:
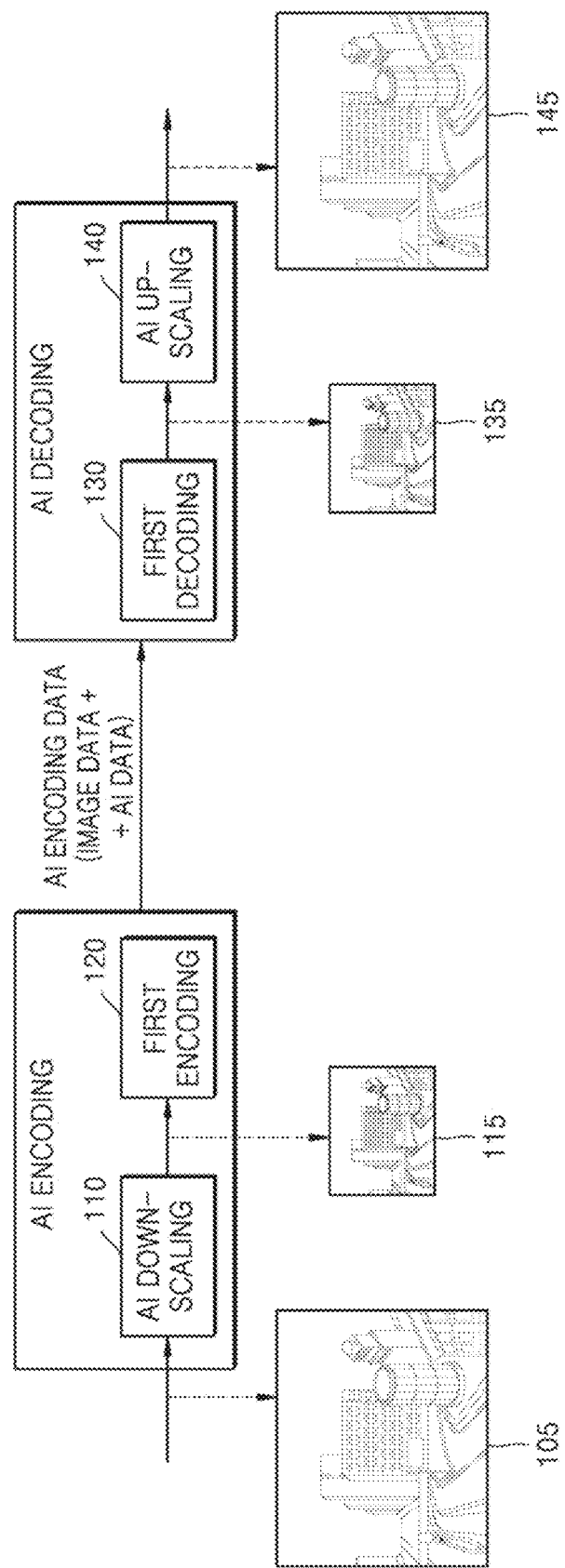
FIG. 1 is a diagram for describing an artificial intelligence (AI) encoding process and an AI decoding process, according to an embodiment.

In the disclosure, a computer-recordable recording medium has stored thereon a video file including artificial intelligence (AI) encoding data, wherein the AI encoding data includes: image data including encoding information of a low resolution image generated by AI down-scaling a high resolution image; and AI data about AI up-scaling of the low resolution image reconstructed according to the image data, wherein the AI data includes: AI target data indicating whether AI up-scaling is to be applied to at least one frame; and AI supplementary data about up-scaling deep neural network (DNN) information used for AI up-scaling of the at least one frame from among a plurality of pieces of pre-set default DNN configuration information, when AI up-scaling is applied to the at least one frame.

Mode of Disclosure

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In particular, in FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

Figure 2:
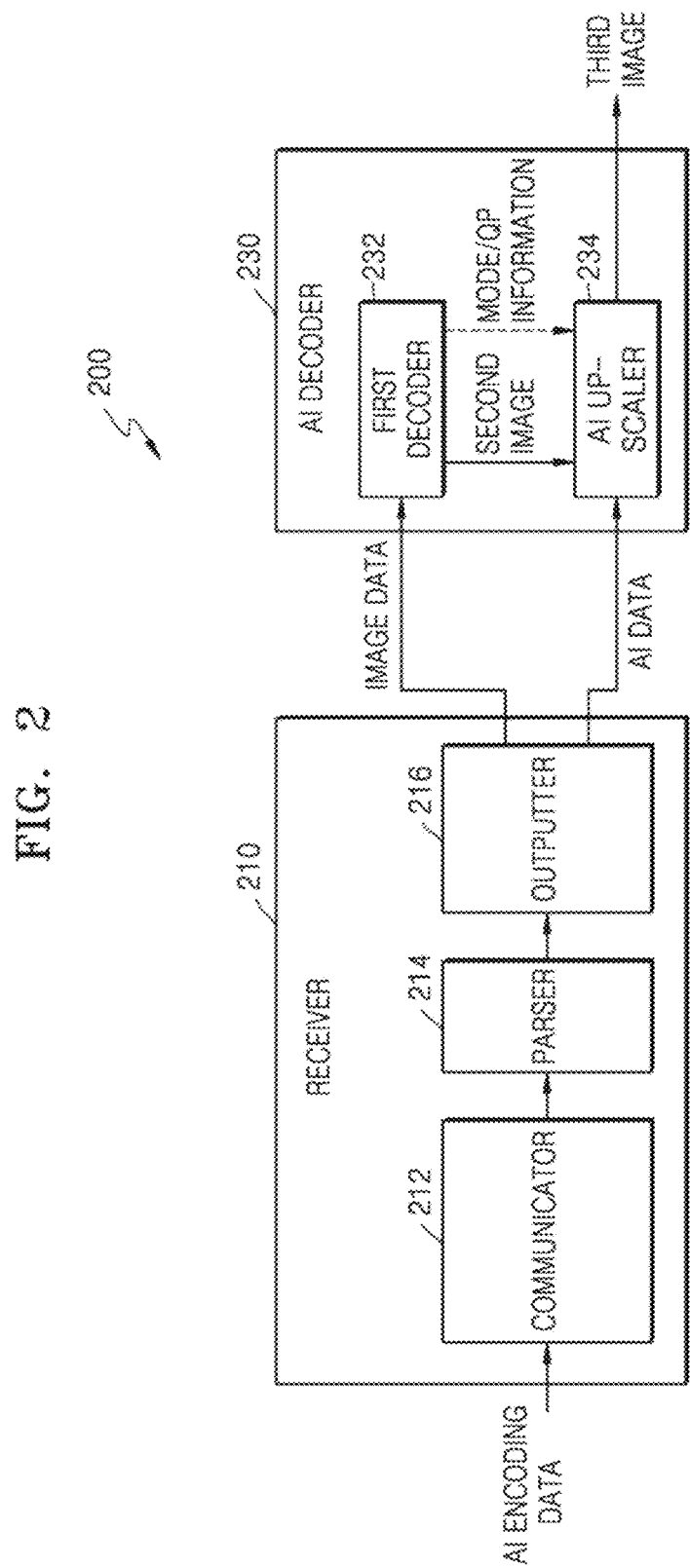
FIG. 2 is a block diagram of a configuration of an AI decoding apparatus according to an embodiment.

FIG. 2 is a block diagram of a configuration of an AI decoding apparatus 100 according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communicator 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to distinguish the image data and the AI data. For example, the parser 214 may distinguish the image data and the AI data by reading a header of data obtained from the communicator 212. According to an embodiment, the parser 214 distinguishably transmits the image data and the AI data to the outputter 216 via the header of the data received through the communicator 212, and the outputter 216 transmits the distinguished image data and AI data respectively to the first decoder 232 and the AI up-scaler 234. At this time, it may be verified that the image data included in the AI encoding data is image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
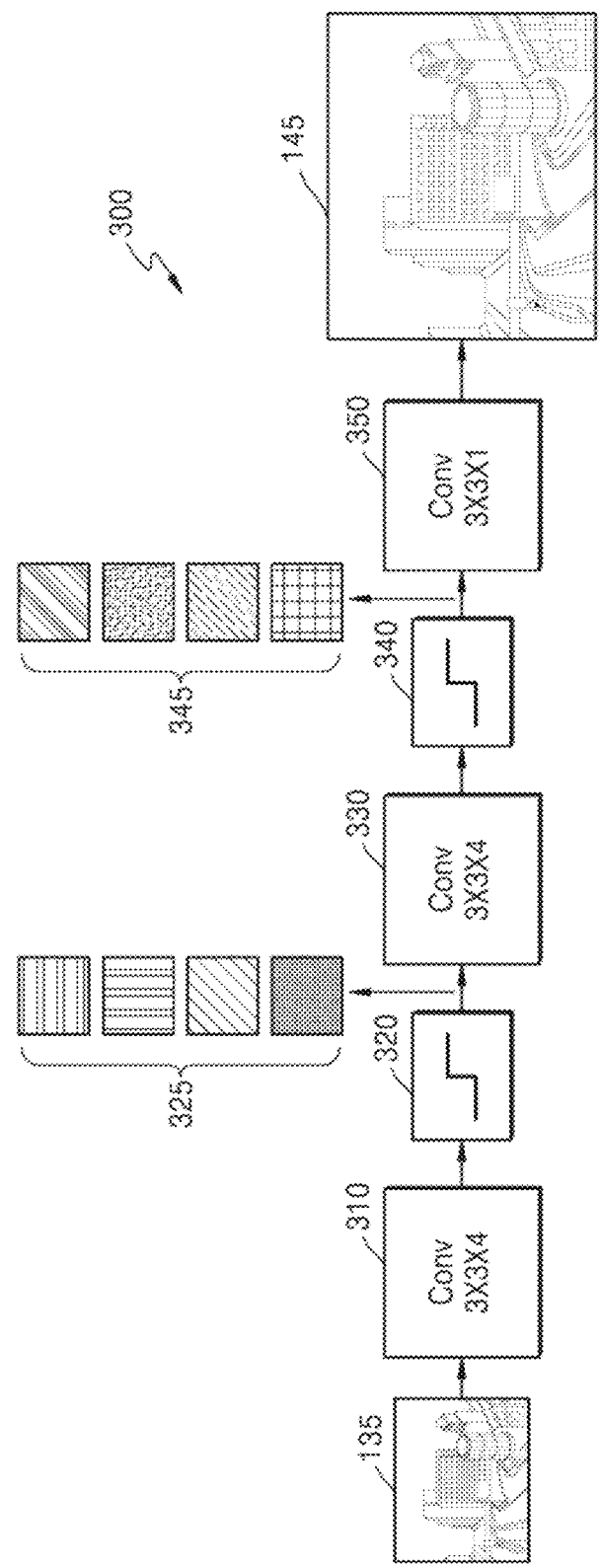
FIG. 3 is a diagram showing a second deep neural network (DNN) for performing AI up-scaling on a second image.
Figure 4:
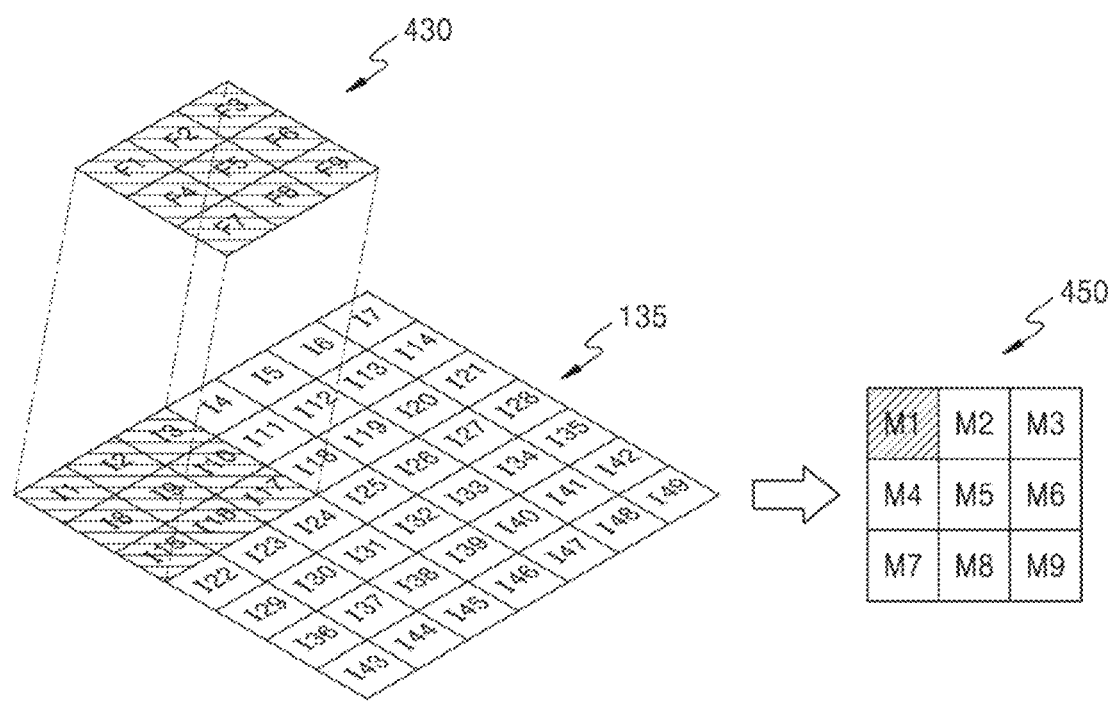
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc of the second image 135.

A convolution operation in the first convolution layer 310 will be described in detail with reference to FIG. 4.

One feature map 450 may be generated through multiplication and addition between parameters of a filter kernel 430 having a a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
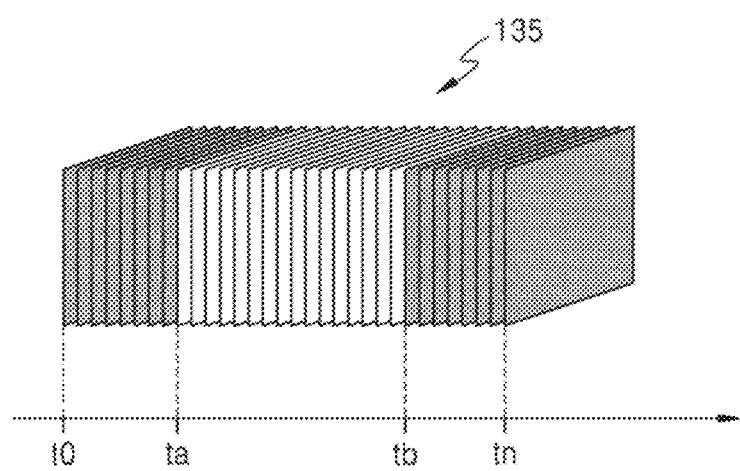
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
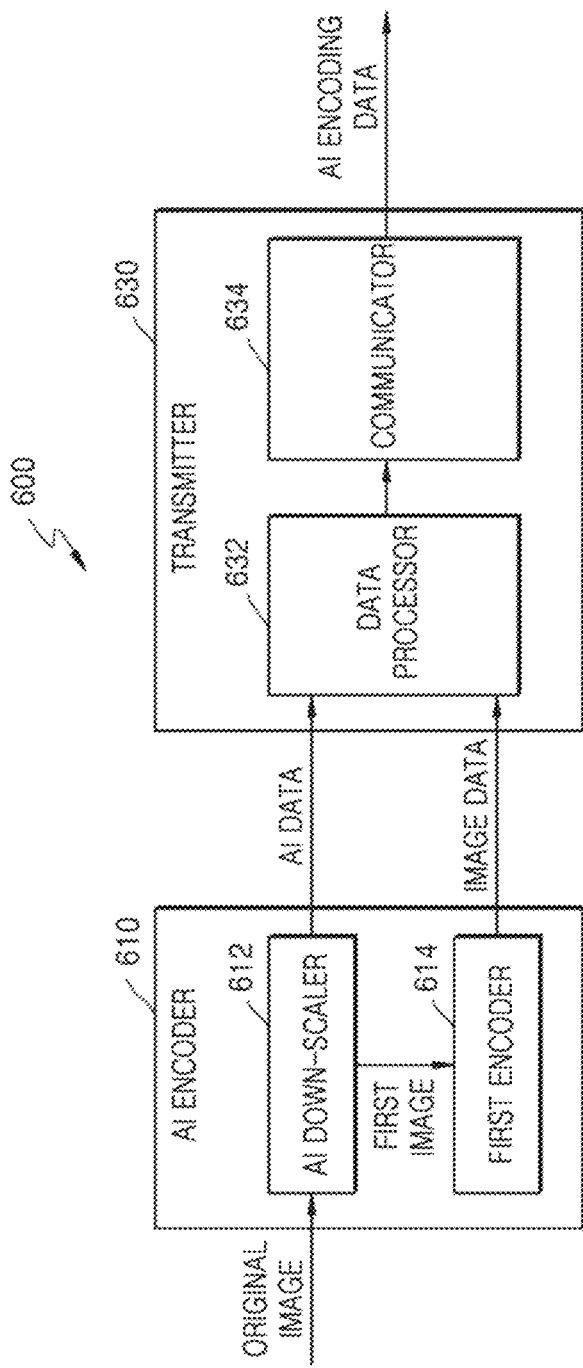
FIG. 7 is a block diagram of a configuration of an AI encoding apparatus according to an embodiment.

FIG. 7 is a block diagram of a configuration of the AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames, or may determine down-scaling target for entire frames.

According to an embodiment, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
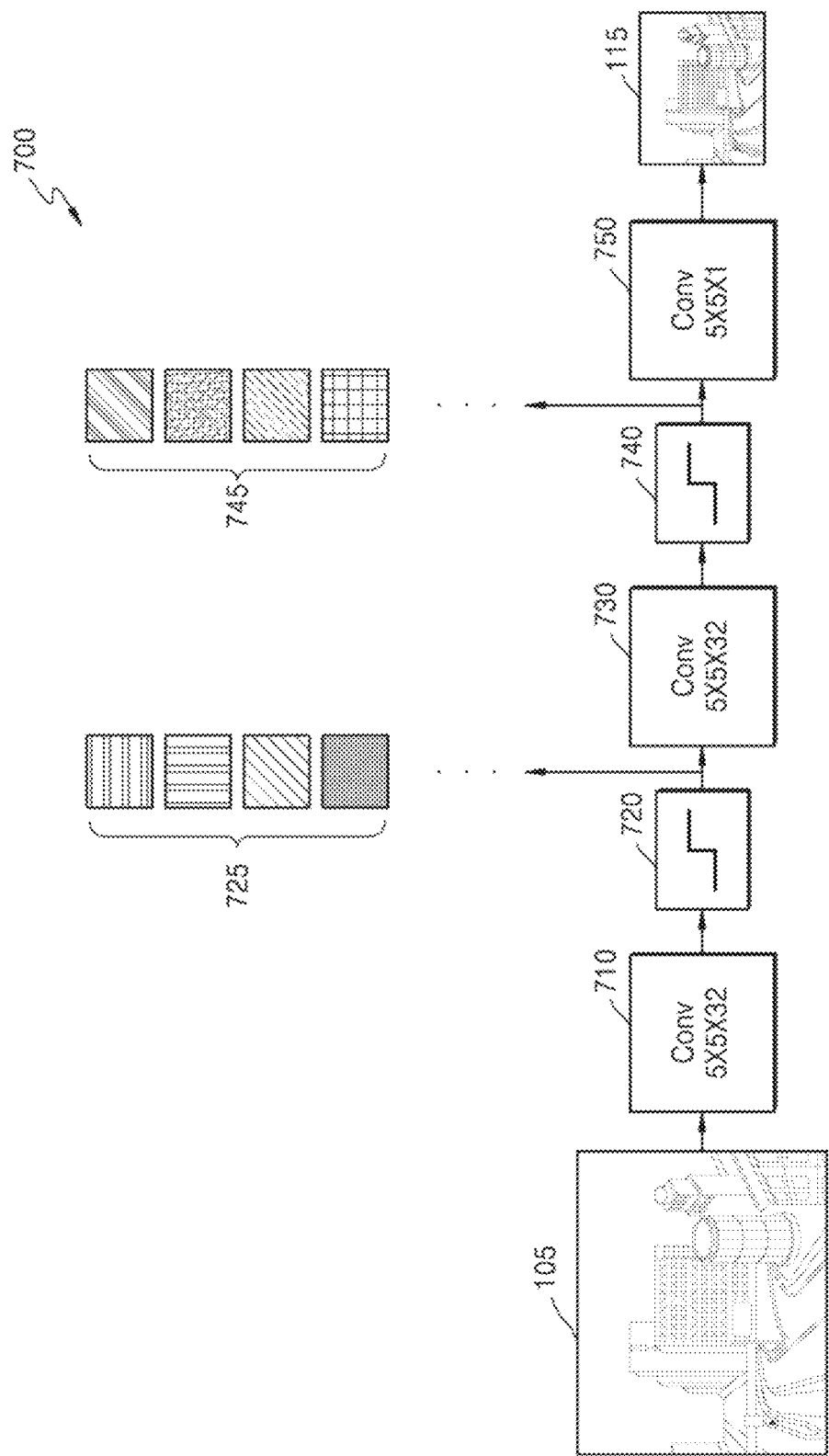
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
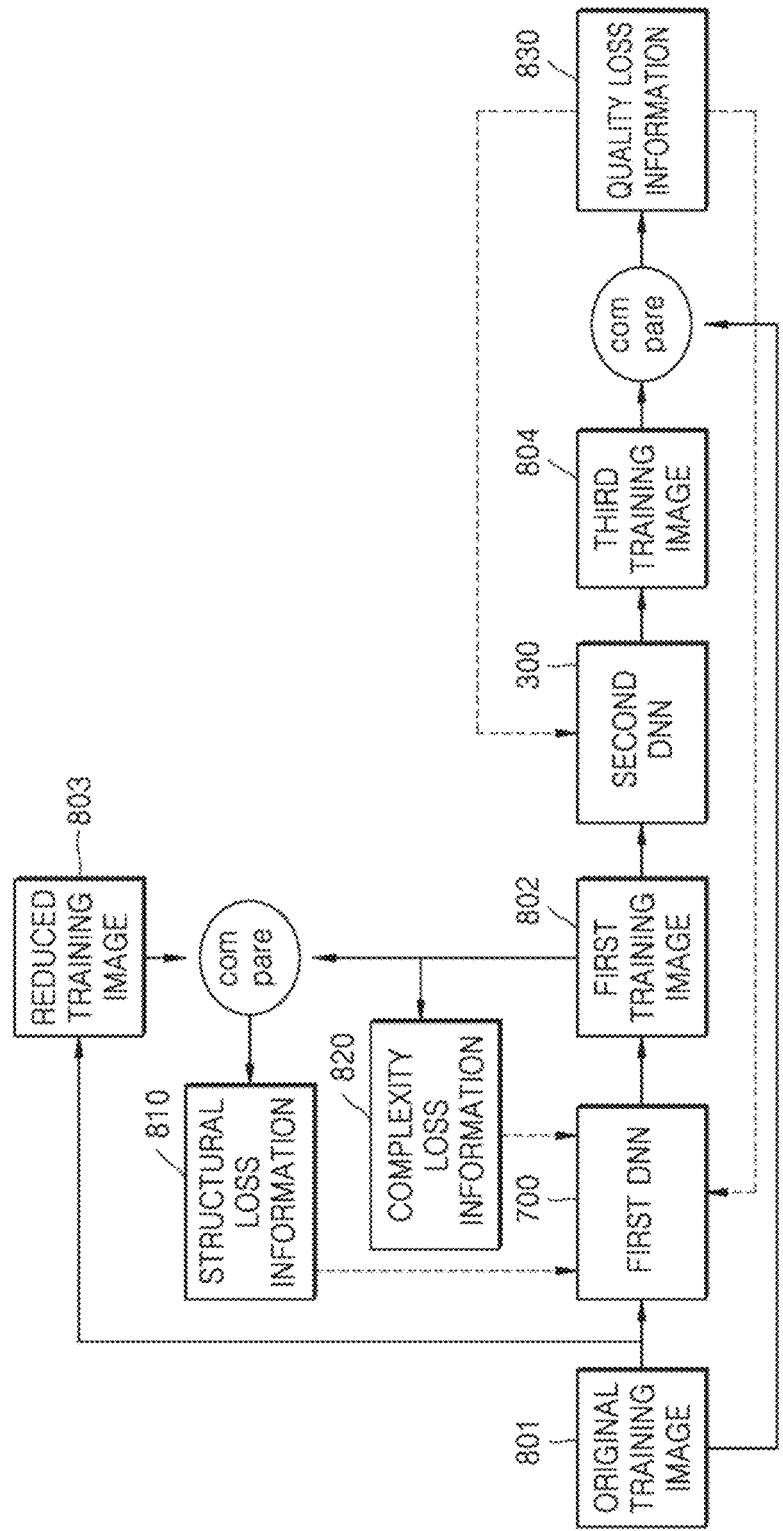
FIG. 9 is a diagram for describing a method of training a first DNN and a second DNN.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM(MS-SSIM) value, a Variance Inflation Factor (VIF) value, or a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$LossDS = a \times \text{Structural loss information} + b \times \text{Complexity loss information} + c \times \text{Quality loss information}$$

$$LossUS = d \times \text{Quality loss information} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
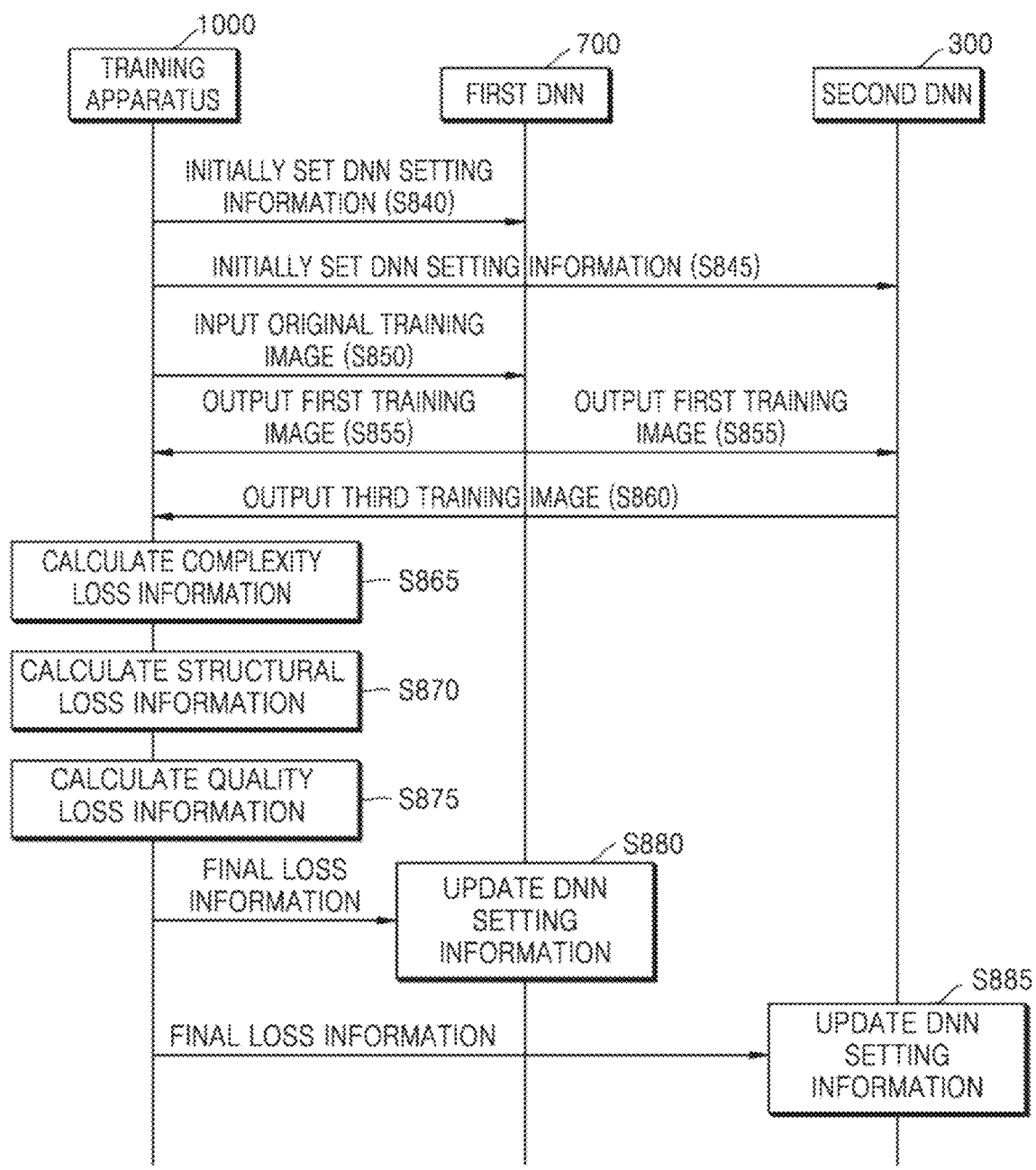
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

an embodiment of the disclosure, is higher than subjective image quality when encoding and decoding are performed via HEVC, a bitrate is reduced by at least 50%.

Figure 11:
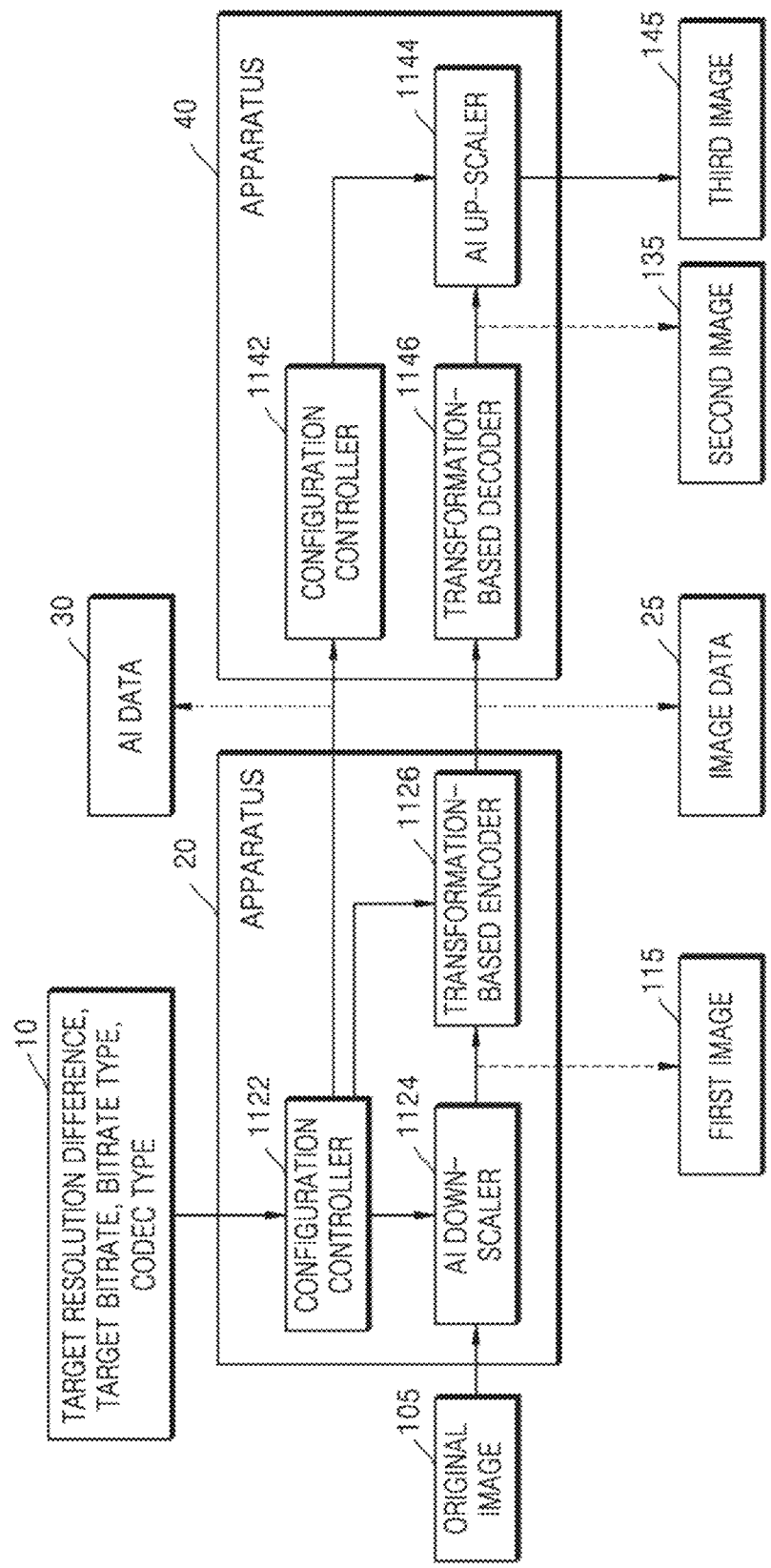
FIG. 11 is a diagram of an apparatus for performing AI down-scaling on an original image and an apparatus for performing AI up-scaling on a second image.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), or

TABLE 1

|  |  |  | Information Amount (Bitrate) (Mbps) | | Subjective Image Quality Score (VMAF) | |
| --- | --- | --- | --- | --- | --- | --- |
| Content | Resolution | Frame Number | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) |  | 46.3 | 21.6 | 98.05 | 98.98 |
| Content_03 |  |  | 46.3 | 22.7 | 96.08 | 96.00 |
| Content_04 |  |  | 46.1 | 22.1 | 86.26 | 92.00 |
| Content_05 |  |  | 45.4 | 22.7 | 93.42 | 92.98 |
| Content_06 |  |  | 46.3 | 23.0 | 95.99 | 95.61 |
|  |  | Average | 46.11 | 22.25 | 94.10 | 94.85 |

As shown in Table 1, despite subjective image quality when AI encoding and AI decoding are performed on content including 300 frames of 8 K resolution, according to a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and sets the AI up-scaler 1144 with the obtained DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

In FIGS. 12 through 25, a relationship between AI data and image data in AI encoding data will be described, together with a data structure of the AI data. Hereinafter, an up-scaling DNN is a DNN used to AI up-scale a low resolution image such as the second image 135 to a high resolution image such as the third image 145, like the second DNN 300 of FIG. 3. Up-scaling DNN information indicates DNN configuration information specified according to the AI data and the up-scaling DNN may be configured based on the up-scaling DNN information. The low resolution image indicates an image of low resolution, such as the first image 115 and the second image 135. The high resolution image indicates an image of high resolution, such as the original image 105 and the third image 145.

Figure 12:
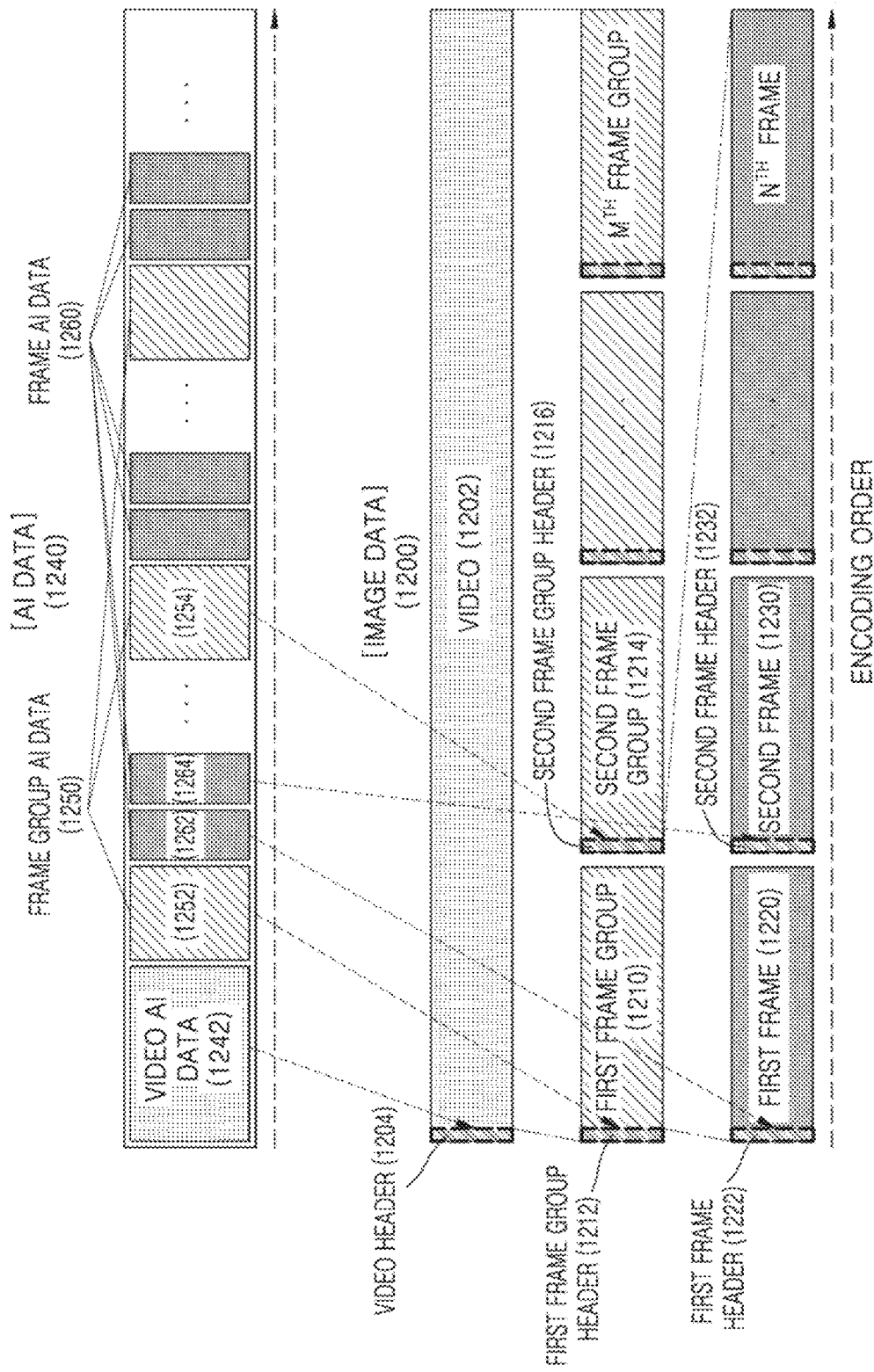
FIG. 12 is a diagram for describing a corresponding relationship between image data and AI data, together with structures of the image data and AI data.

In FIG. 12, a corresponding relationship between image data 1200 and AI data 1240 is described together with structures of the image data 1200 and AI data 1240.

In FIG. 12, a video-frame group-frame layer structure of the image data 1200 is described. A video 1202 of FIG. 12 is a data unit including all consecutive frames of the image data 1200. Parameter information of a video parameter set may be applied to all frames included in the video 1202. The video parameter set is included in a video header 1204.

The video 1202 may include a plurality of frame groups. The frame group is a data unit including one or more consecutive frames sharing parameter information of a frame group parameter set. The frame group may be a group of pictures (GOP) or a coded video sequence (CVS). The frame group parameter set may be included in a frame group header. For example, a frame group parameter set of a first frame group 1210 may be included in a first frame group header 1212. Also, a frame group parameter set of a second frame group 1214 may be included in a second frame group header 1216.

One frame group is independently encoded without referring to another frame group. The frame group may include an instantaneous decoding refresh (IDR) frame or intra random access picture (IRAP) frame encoded without referring to another frame. Also, remaining frames of the frame group are encoded by referring to the IDR frame (or IRAP frame). Accordingly, the first frame group 1210 may be independently encoded without referring to another frame group of the video 1202. Also, a first frame 1220 that is a frame of the first frame group 1210 encoded first is an IDR frame (or IRAP frame). Remaining frames of the first frame group 1210 including a second frame 1230 are encoded by referring to the first frame 1220.

A frame indicates one still image included in a video. A frame header may include a frame parameter set including parameter information applied to a frame. For example, a first frame header 1222 of the first frame 1220 may include a frame parameter set applied to the first frame 1220. Similarly, a second frame header 1232 of the second frame 1230 may include a frame parameter set applied to the second frame 1230.

A classification method of the AI data 1240 according to the video-frame group-frame layer structure described in FIG. 12 will be described. The AI data 1240 may be classified into video AI data 1242, frame group AI data 1250, and frame AI data 1260 according to an application range. The video AI data 1242 denote AI data commonly applied to all frame groups included in the video 1202. Also, the frame group AI data 1250 denote AI data commonly applied to frames included in a current frame group. Also, the frame AI data 1260 denote AI data applied to a current frame.

The video AI data 1242 corresponds to the video header 1204. Accordingly, the video AI data 1242 may be decoded in parallel with the video header 1204. Alternatively, the video AI data 1242 may be decoded immediately before decoding of the video header 1204. Alternatively, the video AI data 1242 may be decoded immediately after decoding of the video header 1204.

The frame group AI data 1250 corresponds to a frame group header. According to FIG. 12, first frame group AI data 1252 corresponds to the first frame group header 1212. Also, second frame group AI data 1254 corresponds to a second frame group header 1216. The first frame group AI data 1252 and the second frame group AI data 1254 may be decoded in parallel with the first frame group header 1212 and the second frame group header 1216, respectively. Alternatively, the first frame group AI data 1252 and the second frame group AI data 1254 may be decoded immediately before decoding of the first frame group header 1212 and the second frame group header 1216, respectively. Alternatively, the first frame group AI data 1252 and the second frame group AI data 1254 may be decoded immediately after decoding of the first frame group header 1212 and the second frame group header 1216, respectively.

The frame AI data 1260 corresponds to a frame header. According to FIG. 12, first frame AI data 1262 corresponds to the first frame header 1222. Also, second frame AI data 1264 corresponds to the second frame header 1232. The first frame AI data 1262 and the second frame AI data 1264 may be decoded in parallel with the first frame header 1222 and the second frame header 1232, respectively. Alternatively, the first frame AI data 1262 and the second frame AI data 1264 may be decoded immediately before decoding of the first frame header 1222 and the second frame header 1232, respectively. Alternatively, the first frame AI data 1262 and the second frame AI data 1264 may be decoded immediately after decoding of the first frame header 1222 and the second frame header 1232, respectively.

According to an embodiment of the disclosure, the data processor 632 of FIG. 7 may generate AI encoding data in a single file format including both the image data 1200 and the AI data 1240. The communicator 634 transmits the AI encoding data in the single file format to a communicator 212 of FIG. 2. In the specification, a file denotes a group of data stored in a memory. Also, a video file denotes a group of image data stored in a memory and the image data may be implemented in a form of a bitstream.

According to an embodiment of the disclosure, the AI data 1240 may not be embedded in the image data 1200 and may be configured separately from the image data 1200 in a single file. Accordingly, despite the AI encoding data is configured in a single file, because the AI data 1240 and the image data 1200 are separated, the AI data 1240 and/or the image data 1200 may include information about synchronization of the AI data 1240 and the image data 1200.

The communicator 212 may receive AI encoding data. Also, the parser 214 may extract AI data and image data from the AI encoding data. Also, the outputter 216 transmits the image data to the first decoder 232 and the AI data to the AI up-scaler 234. Also, the first decoder 232 generates a low resolution image by decoding the image data. Also, the AI up-scaler 234 obtains up-scaling DNN information suitable for up-scaling of the low resolution image, based on the AI data, and AI up-scales the low resolution image by using an up-scaling DNN set according to the up-scaling DNN information.

According to an embodiment of the disclosure, synchronization data for synchronization of the AI data and the image data may be included in the AI encoding data. The synchronization data may be included in the AI encoding data independently from the AI data and the image data. Alternatively, the synchronization data may be included in the AI data or the image data. The parser 214 may synchronize the image data and the AI data according to the synchronization data. Alternatively, the AI up-scaler 234 may synchronize the image data and the AI data according to the synchronization data. The up-scaling DNN information suitable for AI up-scaling the low resolution image may be selected according to the synchronization data.

According to an embodiment of the disclosure, the AI data 1240 may be embedded in the image data 1200. For example, the video AI data 1242 may be embedded in the video header 1204. Accordingly, the video header 1204 may include the video AI data 1242 together with the video parameter set. Thus, the video AI data 1242 may be decoded together with the video parameter set. Alternatively, the video AI data 1242 may be embedded in a single file to be located before or after the video header 1204, independently from the video header 1204. Accordingly, the video AI data 1242 may be decoded immediately before or after decoding of the video header 1204.

Similarly, the first frame group header 1212 may be included in the first frame group AI data 1252 together with the frame group parameter set. Thus, the first frame group AI data 1252 may be decoded together with the frame group parameter set. Alternatively, the first frame group AI data 1252 may be embedded in a single file to be located before or after the first frame group header 1212, independently from the first frame group header 1212. Accordingly, the first frame group AI data 1252 may be decoded immediately before or after decoding of the first frame group header 1212.

Similarly, the first frame header 1222 may include the first frame AI data 1262 together with the frame parameter set. Thus, the first frame AI data 1262 may be decoded together with the frame parameter set. Alternatively, the first frame AI data 1262 may be embedded in a single file to be located before or after the first frame header 1222, independently from the first frame header 1222. Accordingly, the first frame AI data 1262 may be decoded immediately before or after decoding of the first frame header 1222.

Figure 13A:
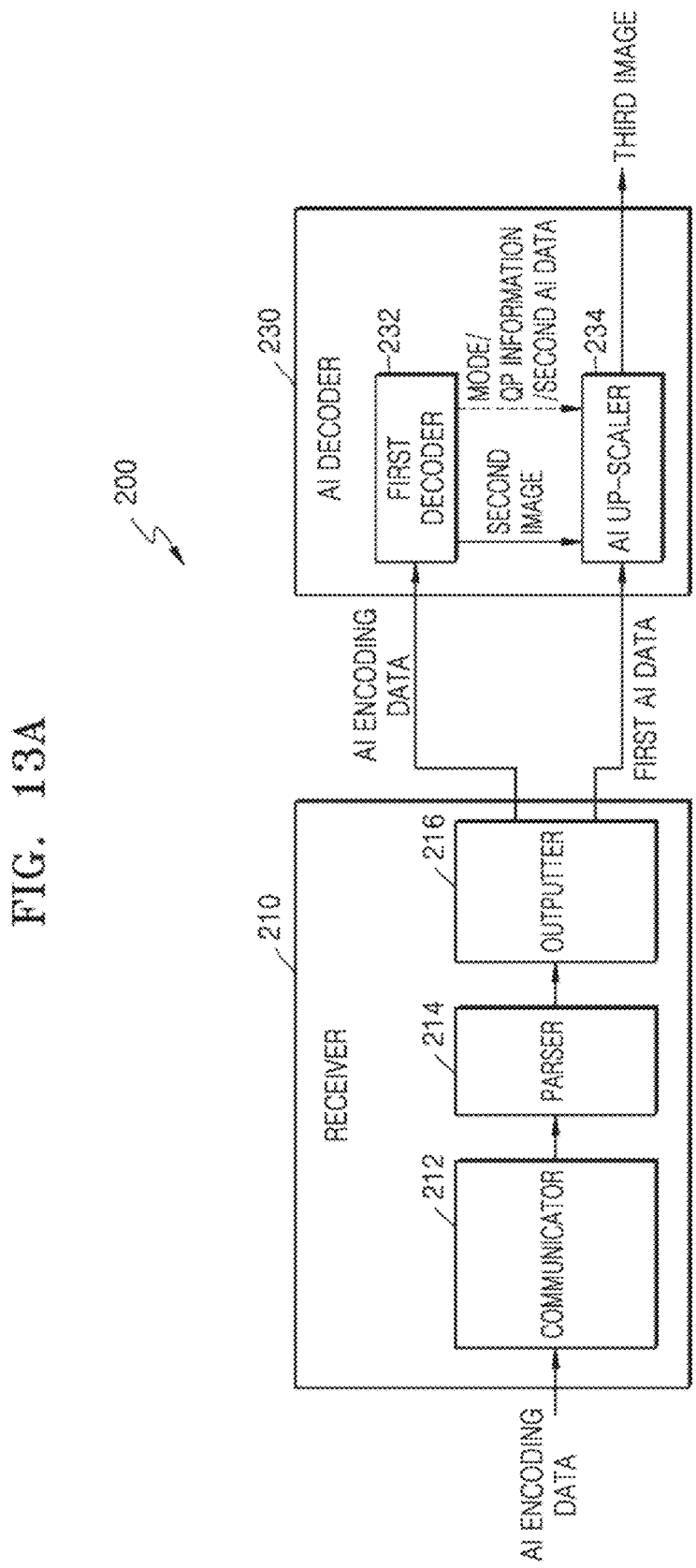
FIG. 13A is a diagram for describing a flow of data in an AI decoding apparatus, when AI data is embedded in image data.

A flow of data in the AI decoding apparatus 200 when AI data is embedded in image data will be described with reference to FIG. 13A.

In AI encoding data, when the AI data is embedded in the image data, the AI data is unable to be decoded independently without decoding of the image data. Thus, the AI data embedded in the image data is extracted from the image data while the first decoder 232 decodes the image data. Also, the AI data extracted from the image data is transmitted from the first decoder 232 to the AI up-scaler 234.

According to an embodiment of the disclosure, a part of the AI data may be embedded in the image data and the remaining part of the AI data may be included in the AI encoding data independently from the image data. For example, video AI data may be included in the AI encoding data independently from the image data and frame group AI data and frame AI data may be embedded in the image data.

First AI data present independently from the image data may be separated from the image data by the parser 214. Also, the first AI data separated from the image data may be transmitted from the outputter 216 to the AI up-scaler 234. The first AI data may be video AI data and/or video segment AI data.

Also, second AI data embedded in the image data is extracted from the image data by the first decoder 232. The extracted second AI data is transmitted from the first decoder 232 to the AI up-scaler 234. Also, the AI up-scaler 234 obtains up-scaling DNN information required for AI up-scaling of a low resolution image, according to the first AI data and the second AI data. The second AI data may be frame group AI data and/or frame AI data.

According to an embodiment of the disclosure, the data processor 632 may separately generate a file corresponding to the image data 1200 and a file corresponding to the AI data 1240. Accordingly, the communicator 634 transmits the AI encoding data to the communicator 212 in two file formats. Thus, the communicator 634 may transmit the file corresponding to the image data 1200 and the file corresponding to the AI data 1240 via different communication channels. Also, the communicator 634 may sequentially transmit the file corresponding to the image data 1200 and the file corresponding to the AI data 1240 with a time difference.

According to an embodiment of the disclosure, according to the corresponding relationship between the image data 1200 and the AI data 1240 described with reference to FIG. 12, the file corresponding to the AI data 1240 may be decoded dependently on a decoding process of the file corresponding to the image data 1200. Also, because the file corresponding to the image data 1200 and the file corresponding to the AI data 1240 are separated, the file corresponding to the image data 1200 and the file corresponding to the AI data 1240 may include information about synchronization of the two files.

Figure 13B:
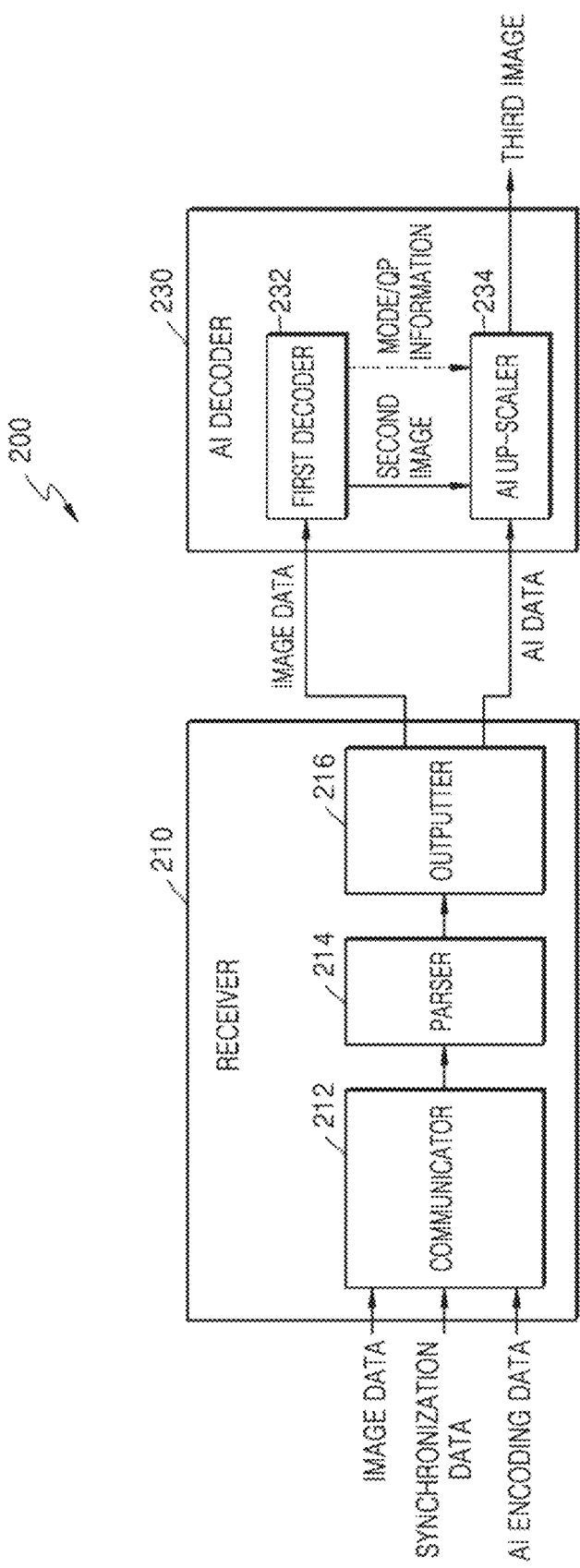
FIG. 13B is a diagram for describing a flow of data in an AI decoding apparatus, when AI data and image data are separated and included in two files.

FIG. 13B is a diagram for describing a flow of data in the AI decoding apparatus 200, when AI data and image data are separated and configured in two files.

The communicator 212 may separately receive a file including image data and a file including AI data, instead of a single file including AI encoding data. Also, the communicator 212 may obtain synchronization data required for synchronization of the image data and the AI data from the file including the image data or the file including the AI data. According to an embodiment of the disclosure, the synchronization data may be transmitted from a separate file. In FIG. 13B, the synchronization data is represented as data independent from the AI data, but according to an embodiment of the disclosure, the AI data or the image data may include the synchronization data.

According to an embodiment of the disclosure, the parser 214 may synchronize the image data and the AI data according to the synchronization data. Also, the outputter 216 may transmit the synchronized image data to the first decoder 232 and the synchronized AI data to the AI up-scaler 234.

According to an embodiment of the disclosure, the outputter 216 may transmit the image data to the first decoder 232. Also, the AI data and the synchronization data may be transmitted to the AI up-scaler 234. The AI up-scaler 234 AI up-scales a low resolution image output from the first decoder 232 by using up-scaling DNN information obtained according to the synchronization data and the AI data.

Figure 14:
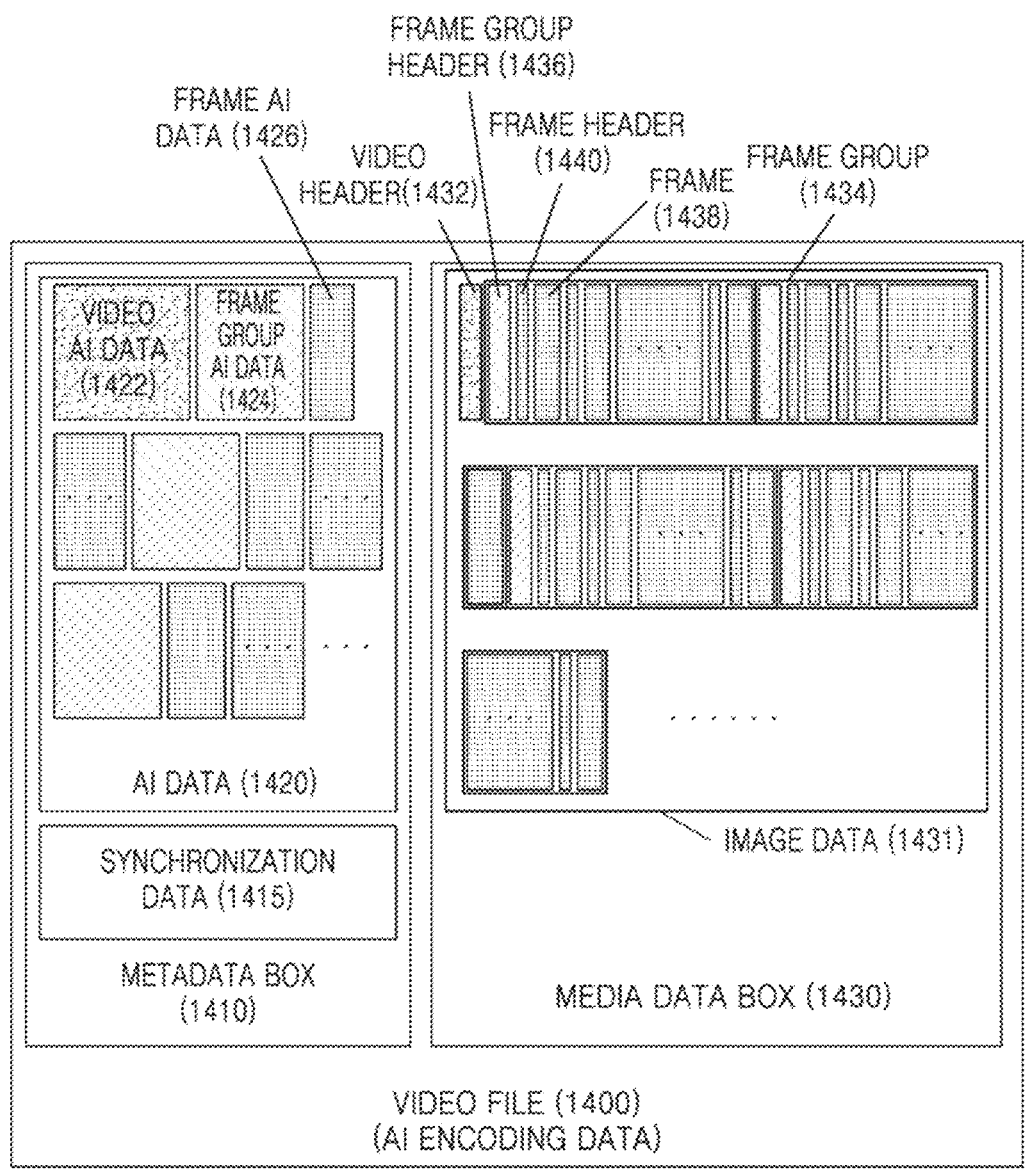
FIG. 14 illustrates an example of AI encoding data when AI data and image data are separated in a single file.

FIG. 14 illustrates an example of AI encoding data when AI data 1420 and image data 1431 are separated in a single file. In FIG. 14, the AI encoding data is included in a video file 1400 of a certain container format. The certain container format may be MP4, AVI, MKV, or FLV.

The video file 1400 includes a metadata box 1410 and a media data box 1430. Information about media data included in the media data box 1430 is included in the metadata box 1410. For example, the metadata box 1410 may include information about a type of media data, a type of codec used to encode the media data, and a reproduction time of media.

The metadata box 1410 may include synchronization data 1415 and the AI data 1420. The synchronization data 1415 and the AI data 1420 are stored in the metadata box 1410 after being encoded according to an encoding method provided by the certain container format.

The parser 214 may extract the synchronization data 1415 and the AI data 1420 from the metadata box 1410. Also, the parser 214 may extract the image data 1431 from the media data box 1430. The outputter 216 may transmit the image data 1431 to the first decoder 232 and transmit the AI data 1420 to the AI up-scaler 234, according to the synchronization data 1415. Alternatively, the outputter 216 may transmit the synchronization data 1415 to the AI up-scaler 234 and the AI up-scaler 234 may synchronize the image data 1431 and the AI data 1420, according to the synchronization data 1415.

The AI data 1420 may include video AI data 1422, frame group AI data 1424, and frame AI data 1426. The video AI data 1422 may be set to correspond to a video header 1432, the frame group AI data 1424 may be set to correspond to a frame group header 1436, and the frame AI data 1426 may be set to correspond to a frame header 1440.

According to an embodiment of the disclosure, when the same up-scaling DNN information is used for all frames of a video, the frame group AI data 1424 and the frame AI data 1426 may be omitted from the AI data 1420. Alternatively, when up-scaling DNN information is adaptively obtained for each frame group unit and the same up-scaling DNN information is used for all frames of a frame group, the frame AI data 1426 may be omitted from the AI data 1420.

The synchronization data 1415 includes information about synchronization of the video AI data 1422, the frame group AI data 1424, and the frame AI data 1426, and the video header 1432, the frame group header 1436, and the frame header 1440. For example, the synchronization data 1415 may include reproduction order information or decoding order information of the image data 1431 of the media data box 1430. Accordingly, the AI up-scaler 234 may obtain up-scaling DNN information required for AI up-scaling of a low resolution image, from AI data determined according to the reproduction order information or decoding order information of the synchronization data 1415.

For example, in order to AI up-scale a low resolution image of a frame 1438, the parser 214 or the AI up-scaler 234 may determine the frame group AI data 1424 corresponding to a frame group 1434 or the frame AI data 1426 corresponding to the frame 1438, based on the synchronization data 1415. Also, the AI up-scaler 234 may obtain up-scaling DNN information for AI up-scaling of the low resolution image of the frame 1438, considering the video AI data 1422 applied to all frames together with the frame group AI data 1424 and the frame AI data 1426.

The AI data 1420 of the metadata box 1410 may be decoded before the image data 1431 of the media data box 1430. Accordingly, the AI up-scaler 234 may obtain the up-scaling DNN information before decoding of the image data 1431, according to the AI data 1420. The up-scaling DNN information may be applied to the entire video. Alternatively, different pieces of up-scaling DNN information may be obtained for each frame group for adaptive AI up-scaling of a frame group unit. Alternatively, the up-scaling DNN information may be pre-obtained differently for each frame for adaptive AI up-scaling of a frame unit.

The AI up-scaler 234 may decode the AI data 1420 of the metadata box 1410, according to a decoding order of the image data 1431 of the media data box 1430. The video AI data 1422 may be decoded immediately before or after decoding of the video header 1432. Alternatively, the video AI data 1422 may be decoded in parallel with the video header 1432. To decode the video AI data 1422 according to a decoding order of the video header 1432, the synchronization data 1415 may be referred to.

Similarly, the AI up-scaler 234 may decode the frame group AI data 1424 immediately before or after decoding of the frame group header 1436 by the first decoder 232. Alternatively, the AI up-scaler 234 may decode the frame group AI data 1424 in parallel with decoding of the frame group header 1436 by the first decoder 232. To decode the frame group AI data 1424 according to a decoding order of the frame group header 1436, the synchronization data 1415 may be referred to.

Also, the AI up-scaler 234 may decode the frame AI data 1426 immediately before or after decoding of the frame header 1440 by the first decoder 232. Alternatively, the AI up-scaler 234 may decode the frame AI data 1426 in parallel with decoding of the frame header 1440 by the first decoder 232. To decode the frame AI data 1426 according to a decoding order of the frame header 1440, the synchronization data 1415 may be referred to.

In FIG. 14, for convenience of description, one metadata box 1410 and one media data box 1430 are included in the video file 1400. However, the video file 1400 may include two or more metadata boxes and two or more media data boxes. Accordingly, two or more image data segments in which image data is split in certain time units may be stored in the two or more media data boxes. Also, information about the image data segments stored in the two or more media data boxes may be included in the two or more metadata boxes. Also, the two or more metadata boxes may each include AI data.

Figure 15A:
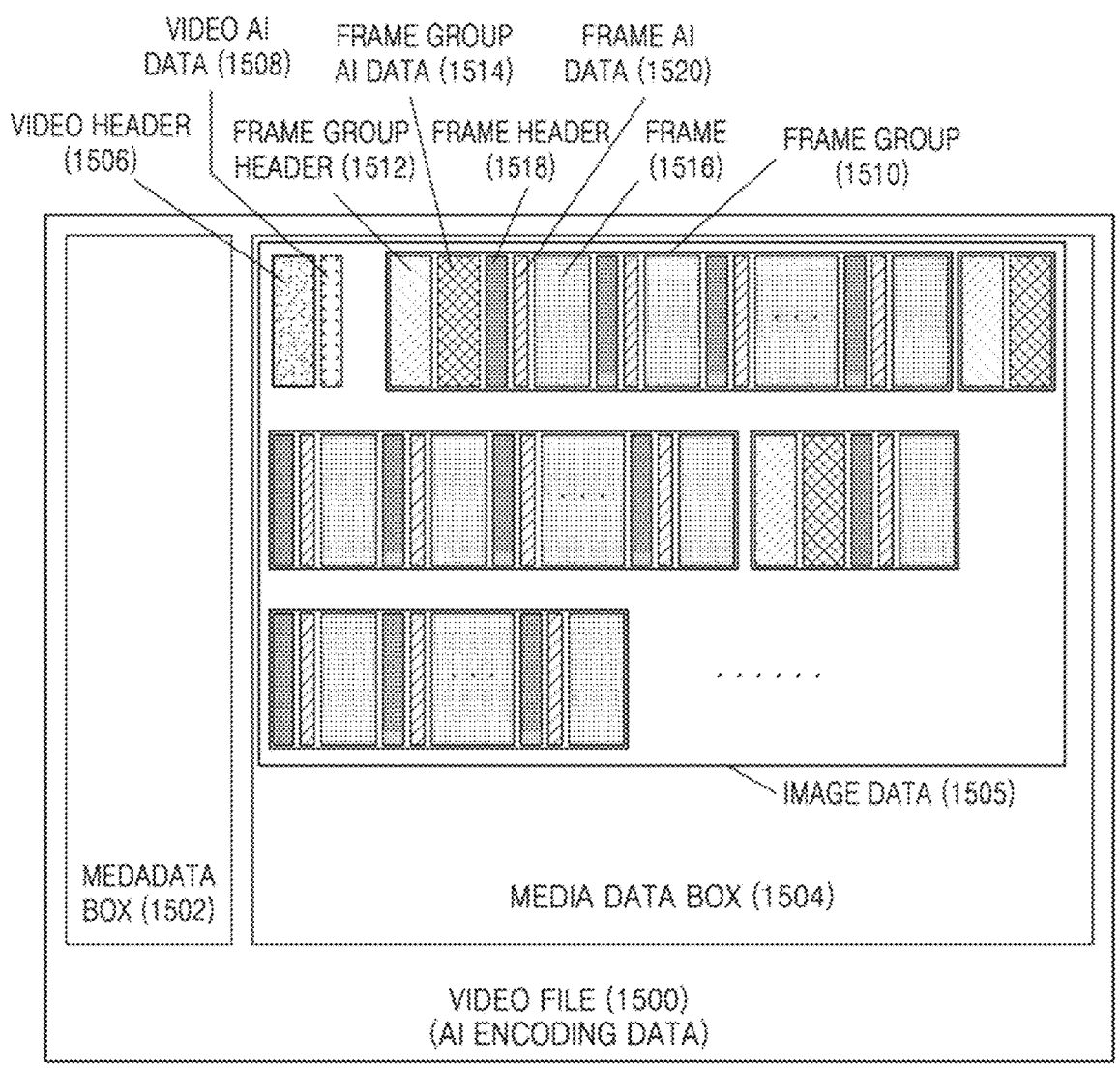
FIG. 15A illustrates an example of AI encoding data when AI data is embedded in image data in a single file.

FIG. 15A illustrates an example of AI encoding data when AI data is embedded in image data 1505.

A video file 1500 includes a metadata box 1502 and a media data box 1504 like the video file 1400 of FIG. 14. Because the AI data is embedded in the image data 1505, the metadata box 1502 does not include the AI data. Instead, the image data 1505 in which the AI data is embedded is included in the media data box 1504. The AI data may be encoded according to a video codec of the image data 1505. For example, the video codec of the image data 1505 may be H.264, HEVC, AVS2.0, and Xvid.

Accordingly, the parser 214 does not extract the AI data from the metadata box 1502. Instead, the first decoder 232 may extract the AI data from the image data 1505 and transmit the extracted AI data to the AI up-scaler 234. Also, the AI up-scaler 234 may AI up-scale a low resolution image reconstructed by the first decoder 232, based on up-scaling DNN information obtained via the AI data.

Unlike the video file 1400 of FIG. 14, because the AI data is embedded in the image data 1505 according to a decoding order of the image data 1505, the video file 1500 may not include synchronization data. Accordingly, the AI data is sequentially decoded as the image data 1505 is decoded.

Video AI data 1508 may be located immediately after a video header 1506 including parameter information of a video. Accordingly, the video AI data 1508 may be decoded after video parameters included in the video header 1506 are decoded. According to an embodiment of the disclosure, unlike FIG. 15A, the video AI data 1508 may be located immediately before the video header 1506.

Frame group AI data 1514 may be located immediately after a frame group header 1512 including parameter information of a frame group 1510. Accordingly, the frame group AI data 1514 may be decoded after frame group parameters included in the frame group header 1512 are decoded. According to an embodiment of the disclosure, unlike FIG. 15A, the frame group AI data 1514 may be located immediately before the frame group header 1512. Decoding orders of pieces of frame group AI data and frame group headers of remaining frame groups decoded after the frame group 1510 may be determined in the same manner as decoding orders of the frame group AI data 1514 and the frame group header 1512.

Frame AI data 1520 may be located immediately after a frame header 1518 including parameter information of a frame 1516. Accordingly, the frame AI data 1520 may be decoded after frame group parameters included in the frame header 1518 are decoded. According to an embodiment of the disclosure, unlike FIG. 15A, the frame AI data 1520 may be located immediately before the frame header 1518. Decoding orders of pieces of frame AI data and frame headers of remaining frames decoded after the frame 1516 may be determined in the same manner as decoding orders of the frame AI data 1520 and the frame header 1518.

FIG. 15A illustrates another example of AI encoding data when AI data is embedded in image data 1525.

Like the video file 1500 of FIG. 15A, a video file 1521 includes a metadata box 1522 and a media data box 1524. Also, the metadata box 1522 does not include the AI data, and instead, the image data 1525 in which the AI data is embedded is included in the media data box 1524. However, unlike the video file 1500 of FIG. 15A, a data header corresponding to the AI data is embedded in the video file 1521.

Video AI data 1528 may be included in a video header 1526 including parameter information of a video. Accordingly, the video AI data 1528 may be decoded together with video parameters included in the video header 1526.

Frame group AI data 1534 may be included in a frame group header 1532 including parameter information of a frame group 1530. Accordingly, the frame group AI data 1534 may be decoded together with frame group parameters included in the frame group header 1532. Frame group AI data of remaining frame groups decoded after the frame group 1530 may also be included in the frame group header 1532.

Frame AI data 1540 may be included in a frame header 1538 including parameter information of a frame 1536. Accordingly, the frame AI data 1540 may be decoded together with frame group parameters included in the frame header 1538. Frame AI data of remaining frames decoded after the frame 1536 may also be included in the frame header 1538.

Figure 15B:
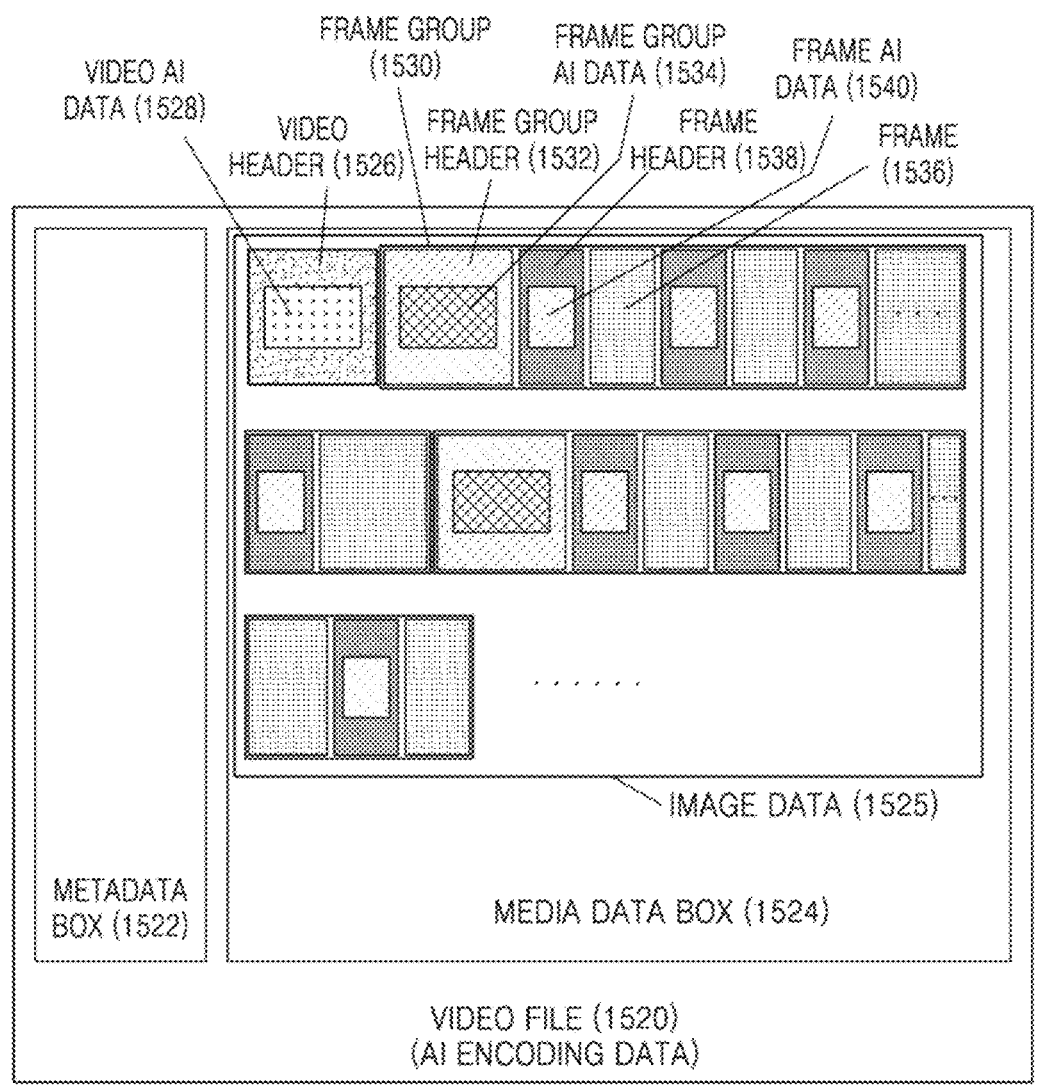
FIG. 15B illustrates an example of AI encoding data when AI data is embedded in image data in a single file.
Figure 15C:
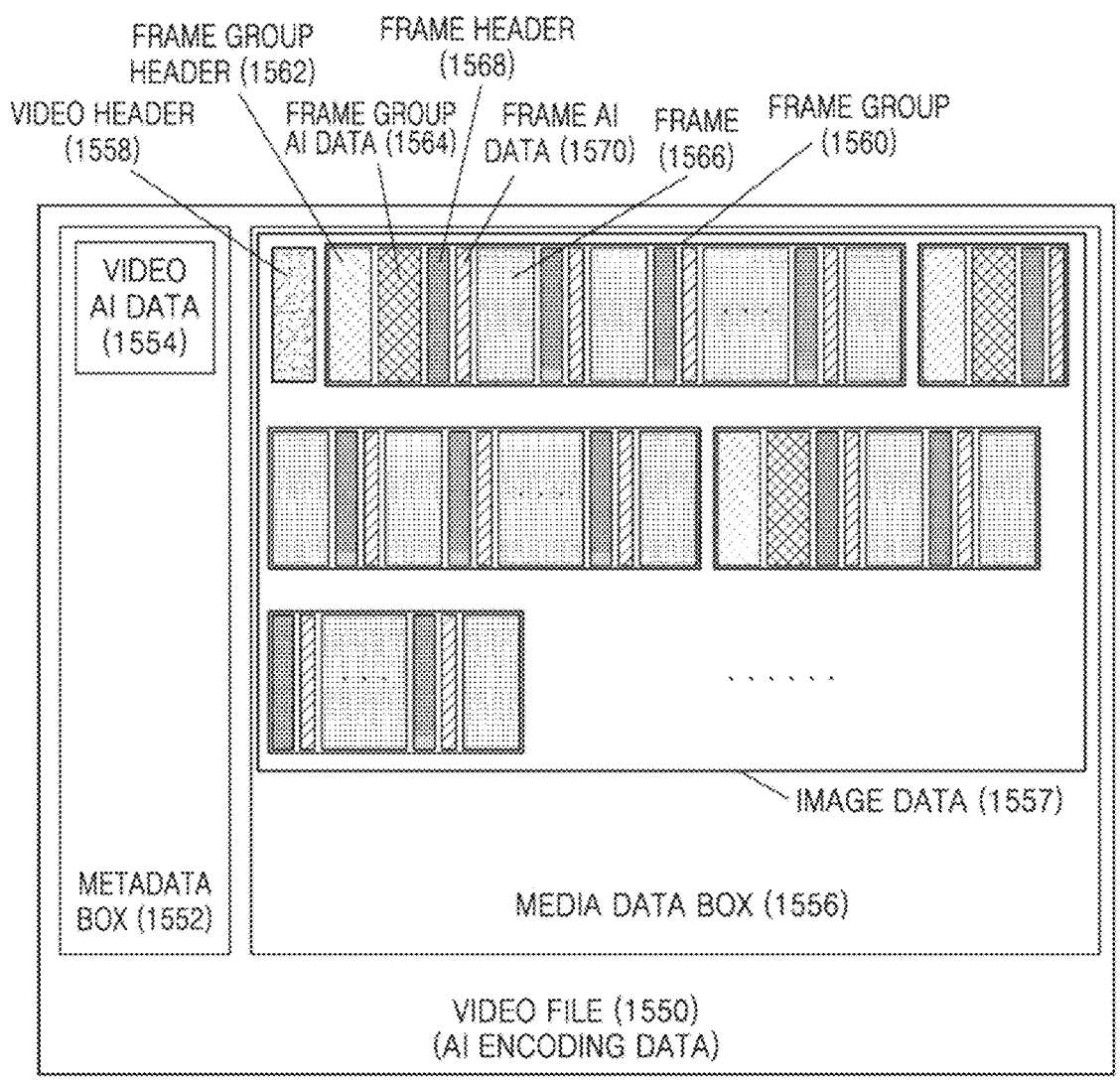
FIG. 15C illustrates an example of AI encoding data when partial AI data is embedded in image data and remaining AI data is separated from the image data in a single file.

FIG. 15C illustrates an example of AI encoding data when partial AI data is embedded in image data 1557 and remaining AI data is separated from the image data 1557.

Like the video file 1500 of FIG. 15A, a video file 1550 includes a metadata box 1552 and a media data box 1556. The metadata box 1552 includes video AI data 1554 applied to all frames of a video. Also, frame group AI data 1564 and frame AI data 1570 are included in the image data 1557 of the media data box 1556.

Unlike the video AI data 1508 of FIG. 15A and the video AI data 1528 of FIG. 15B, the video AI data 1554 included in the metadata box 1552 may be decoded before decoding of the image data 1557. Also, the frame group AI data 1564 and the frame AI data 1570 may be sequentially decoded as the image data 1557 is decoded.

Thus, the parser 214 may extract the video AI data 1554 from the metadata box 1552. Also, the communicator 212 may transmit the video AI data 1554 to the AI up-scaler 234. Also, the communicator 212 may transmit the image data 1557 to the first decoder 232. Also, the first decoder 232 may decode the image data 1557 to reconstruct a low resolution image and may extract the frame group AI data 1564 and the frame AI data 1570. Also, the first decoder 232 may transmit the frame group AI data 1564 and the frame AI data 1570 to the AI up-scaler 234. Also, the AI up-scaler 234 may obtain up-scaling DNN information for AI up-scaling of the low resolution image, according to the video AI data 1554, the frame group AI data 1564, and the frame AI data 1570.

The frame group AI data 1564 may be located immediately after a frame group header 1562 including parameter information of a frame group 1560. However, according to an embodiment of the disclosure, the frame group AI data 1564 may be located immediately before the frame group header 1562. Also, the frame group AI data 1564 may be included in the frame group header 1562.

The frame AI data 1570 may be located immediately after a frame header 1568 including parameter information of a frame 1566. However, according to an embodiment of the disclosure, the frame AI data 1570 may be located immediately before the frame header 1568. Also, the frame AI data 1570 may be included in the frame header 1568.

In FIG. 15C, only the video AI data 1554 is included in the metadata box 1552, but the frame group AI data 1564 may be additionally included in the metadata box 1552. Alternatively, a part of the frame group AI data 1564 may be included in the metadata box 1552. Alternatively, a part of the frame AI data 1570 may be included in the metadata box 1552.

In FIGS. 15A and 15C, the frame group AI data 1514 and 1564 and the frame AI data 1520 and 1570 embedded in the media data boxes 1504 and 1556 may be embedded in a form of a supplementary enhancement information (SEI) message. An SEI message is a data unit including additional information about an image, which is not necessarily required when decoding the image. The SEI message may be transmitted in a frame group unit or frame unit. Also, the SEI message may be extracted by the first decoder 232 and transmitted to the AI up-scaler 234 like the second AI data described with reference to FIG. 13A.

Figure 16:
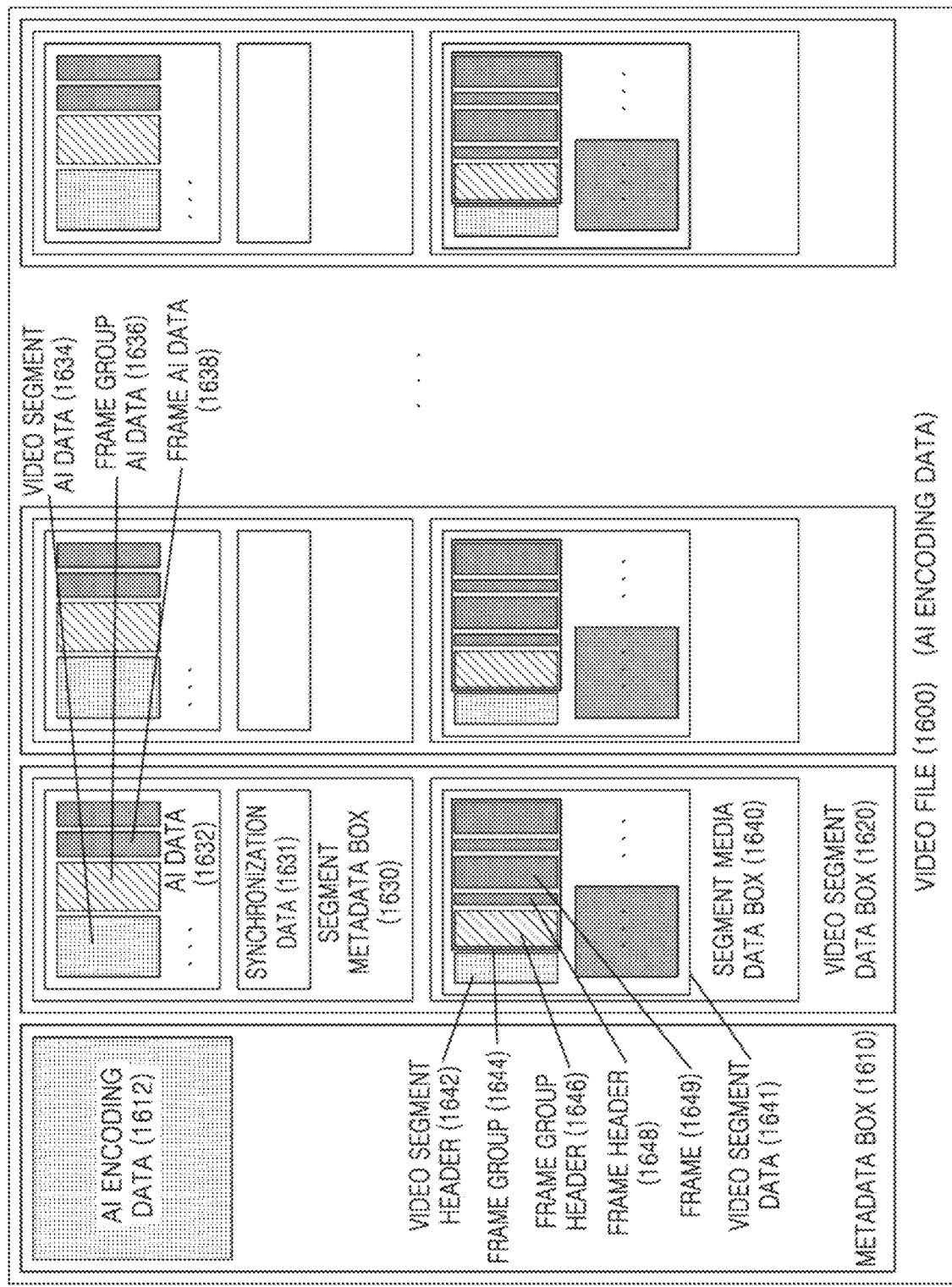
FIG. 16 illustrates an example of AI encoding data split in video segment units when AI data and image data are separated as in FIG. 14.

FIG. 16 illustrates an example of AI encoding data split in video segment units when AI data and image data are separated as in FIG. 14.

When the size of metadata including AI data is large or the image data is live-streamed through a communication channel, the AI encoding data may be split in video segment units and stored in a video file 1600 to reduce overhead required to process the metadata including the AI data. A video segment is a part of a video and includes a frame of a certain time. For example, the video segment may include only one or more frame groups. When the video segment includes one frame group, the video file 1600 may include the number of video segments equal to that of frame groups of the image data.

The video segments may each include a metadata box and a media data box. The metadata including the AI data is split and stored in the plurality of video segments. Accordingly, the AI data is split and stored not only in a metadata box 1610 regarding the entire image data, but also in metadata boxes regarding the video segments. Thus, when a certain part of the image data is AI up-scaled from a low resolution image, the AI data for obtaining up-scaling DNN information suitable to the certain part may be more quickly obtained when the AI data is split and stored in the metadata boxes regarding the video segments as well as the metadata box 1610 compared to when all pieces of AI data are stored in the metadata box 1610 regarding the entire image data.

For example, when reproduction is performed from a current video segment, for AI up-scaling of a low resolution image of the current video segment, only video AI data 1612 of the metadata box 1610 and the AI data of a segment metadata box 1630 of a current video segment data box 1620 may be referred to. Also, AI data of metadata boxes of other video segments are not referred to. Thus, overhead according to decoding of the AI data is reduced.

Also, when the image data is live-streamed, the AI data is not transmitted at once during initial reproduction but may be split and transmitted in video segment units. Thus, because the AI data is split and transmitted sequentially, overhead according to decoding of the AI data may be reduced. Accordingly, splitting and transmitting in video segment units may be advantageous.

In FIG. 16, the metadata box 1610 regarding the entire image data includes the video AI data 1612. The video AI data 1612 is applied to all video segments included in the video. The metadata box 1610 may be decoded before the current video segment data box 1620.

The current video segment data box 1620 includes the segment metadata box 1630 and a segment media data box 1640. The segment metadata box 1630 may include synchronization data 1631 and AI data 1632. Also, the segment media data box 1640 includes video segment data 1641.

The AI data 1632 of the current video segment data box 1620 may include video segment AI data 1634, frame group AI data 1636, and frame AI data 1638. The video segment AI data 1634 is applied to all frame groups included in a current video segment. Also, the frame group AI data 1636 is applied to all frames included in a current frame group. The frame AI data 1638 is applied to a current frame.

According to an embodiment of the disclosure, when the same up-scaling DNN information is used for all frames of a video segment, the frame group AI data 1636 and the frame AI data 1638 may be omitted from the AI data 1632 of the current video segment data box 1620. Alternatively, when up-scaling DNN information is adaptively determined for each frame group unit and the same up-scaling DNN information is used for all frames of the frame group, the frame AI data 1638 may be omitted from the AI data 1632 of the current video segment data box 1620.

According to an embodiment of the disclosure, when a video segment includes one frame group, the video segment AI data 1634 may be omitted from the AI data 1632 of the current video segment data box 1620. Here, the frame group AI data 1636 may perform functions as the video segment AI data 1634. Alternatively, when a video segment includes only one frame group and the same up-scaling DNN information is used for all frames of the frame group, the video segment AI data 1634 and the frame AI data 1638 may be omitted from the AI data 1632 of the current video segment data box 1620. Then, AI up-scaling may be applied to all frames of the video segment, based on the up-scaling DNN information according to the frame group AI data 1636. The synchronization data 1631 includes information about synchronization of the video segment AI data 1634, the frame group AI data 1636, and the frame AI data 1638, and a video segment header 1642, a frame group header 1646, and a frame header 1648. The video segment header 1642 includes a video segment parameter commonly applied to frames included in the video segment. For example, the synchronization data 1631 may include reproduction order information or decoding order information of the video segment data 1641 of the segment media data box 1640. Accordingly, the AI up-scaler 234 may obtain up-scaling information required for AI up-scaling of the low resolution image from AI data determined according to the synchronization data 1631.

For example, in order to up-scale a low resolution image of a frame 1649, the parser 214 or the AI up-scaler 234 may obtain the frame group AI data 1636 corresponding to the frame group 1644 and the frame AI data 1638 corresponding to the frame 1649, based on the synchronization data 1631. Then, the AI up-scaler 234 may obtain the up-scaling DNN information for AI up-scaling of the low resolution image of the frame 1649, considering the video segment AI data 1634 applied to all frames together with the frame group AI data 1636 and the frame AI data 1638.

According to an embodiment of the disclosure, the AI data 1632 of the segment metadata box 1630 may be decoded before the video segment data 1641 of the segment media data box 1640. Accordingly, the AI up-scaler 234 may obtain the up-scaling DNN information before decoding of the video segment data 1641, according to the AI data 1632. The obtained up-scaling DNN information may be applied to entire video segment. Alternatively, for adaptive AI up-scaling of a frame group unit, the up-scaling DNN information may be pre-obtained differently for each frame group. Alternatively, for adaptive AI up-scaling of a frame unit, the up-scaling DNN information may be pre-obtained differently for each frame.

According to an embodiment of the disclosure, the AI up-scaler 234 may decode the AI data 1632 of the segment metadata box 1630 according to a decoding order of the video segment data 1641 of the segment media data box 1640. For example, the AI up-scaler 234 may decode the frame group AI data 1636 according to a decoding order of the frame group header 1646 by the first decoder 232. Also, the AI up-scaler 234 may decode the frame AI data 1638 according to a decoding of the frame header 1648 by the first decoder 232. A decoding order of the video segment AI data 1634, the frame group AI data 1636, and the frame AI data 1638 and a decoding order of the video segment header 1642, the frame group header 1646, and the frame header 1648 may be synchronized by referring to the synchronization data 1631.

Remaining video segment data boxes after the current video segment data box 1620 may be sequentially decoded in the same method as the current video segment data box 1620.

Figure 17:
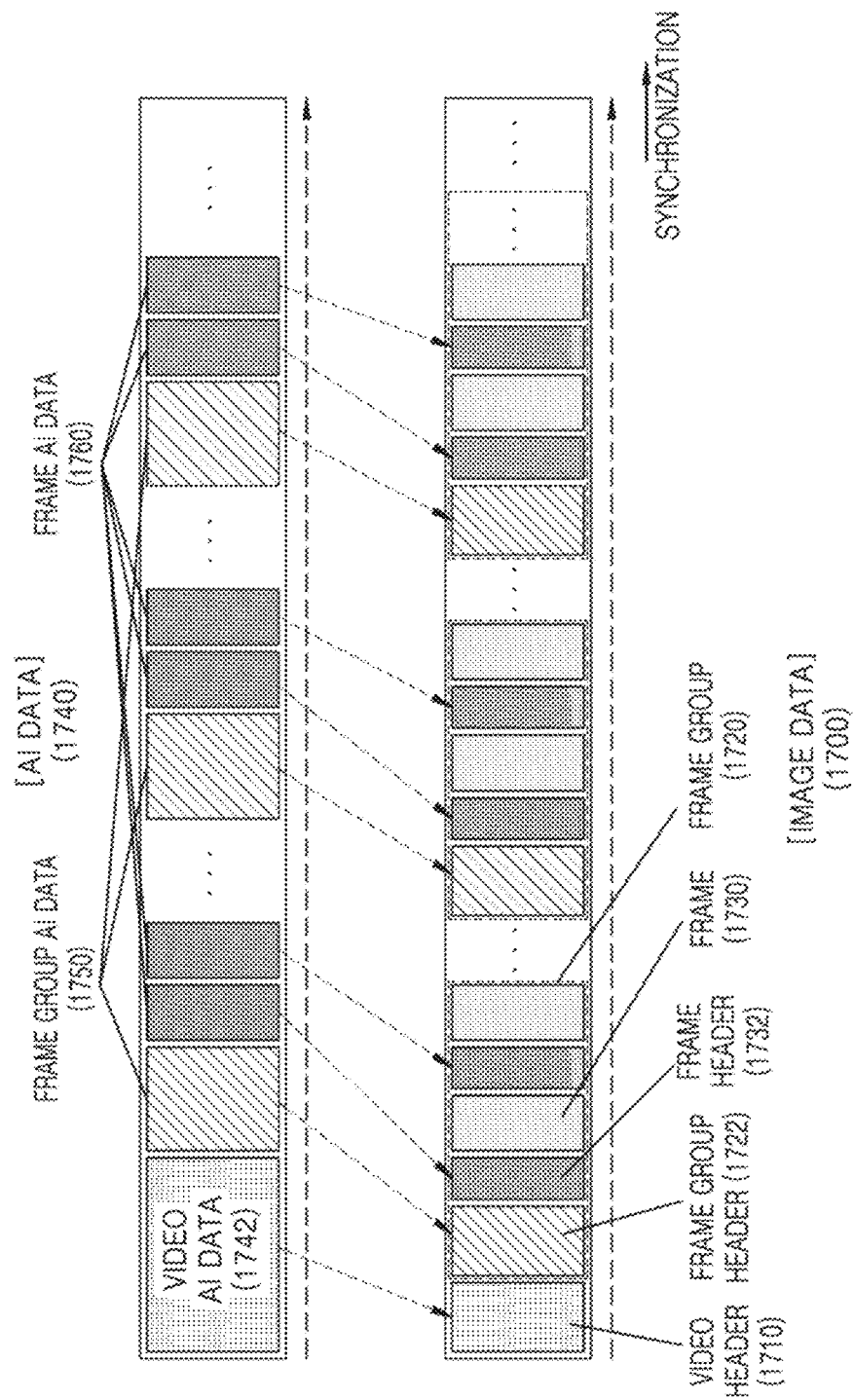
FIG. 17 illustrates an example of AI data and image data separated and transmitted in two files.

FIG. 17 illustrates an example of AI data 1740 and image data 1700 transmitted in two separate files.

When the communicator 212 did not receive the AI data 1740, a low resolution image obtained from the image data 1700 is not AI up-scaled. When the communicator 212 received the AI data 1740, up-scaling DNN information required for AI up-scaling of the low resolution image is obtained according to the AI data 1740 transmitted to the AI up-scaler 234 through the outputter 216.

The image data 1700 may include a video header 1710, a frame group header 1722 of a frame group 1720, and a frame header 1732 of a frame 1730. Also, the AI data 1740 may include video AI data 1742, frame group AI data 1750, and frame AI data 1760. Because the image data 1700 and the AI data 1740 are transmitted in separate files, the image data 1700 and/or the AI data 1740 may include synchronization data required for synchronization of the image data 1700 and the AI data 1740. The synchronization data may indicate a decoding order or reproduction order of the image data 1700.

The parser 214 or AI up-scaler 234 may set a reproduction order or decoding order of the video AI data 1742, the frame group AI data 1750, and the frame AI data 1760 to match a reproduction order or decoding order of the video header 1710, the frame group header 1722, and the frame header 1732, according to the synchronization data. A dashed arrow between the video AI data 1742 and the video header 1710, a dashed arrow between the frame group AI data 1750 and the frame group header 1722, and a dashed arrow between the frame AI data 1760 and the frame header 1732 of FIG. 17 indicate synchronization between AI data and a data header.

The image data 1700 and the AI data 1740 may include identification numbers for matching two pieces of data. For example, the AI data 1740 may include the identification number of the image data 1700 to which the AI data 1740 is applied. On the other hand, the image data 1700 may include the identification number of the AI data 1740 to which the image data 1700 is applied. Alternatively, the image data 1700 and the AI data 1740 may both include the identification numbers. Accordingly, even when the image data 1700 and the AI data 1740 are not simultaneously transmitted, the image data 1700 and the AI data 1740 may be matched to each other according to the identification numbers.

According to an embodiment of the disclosure, when up-scaling DNN information is obtained in frame group units, the frame AI data 1760 may be omitted from the AI data 1740. Also, when the same up-scaling DNN information is used for all frames of a video, the frame group AI data 1750 and the frame AI data 1760 may be omitted from the AI data 1740.

Figure 18A:
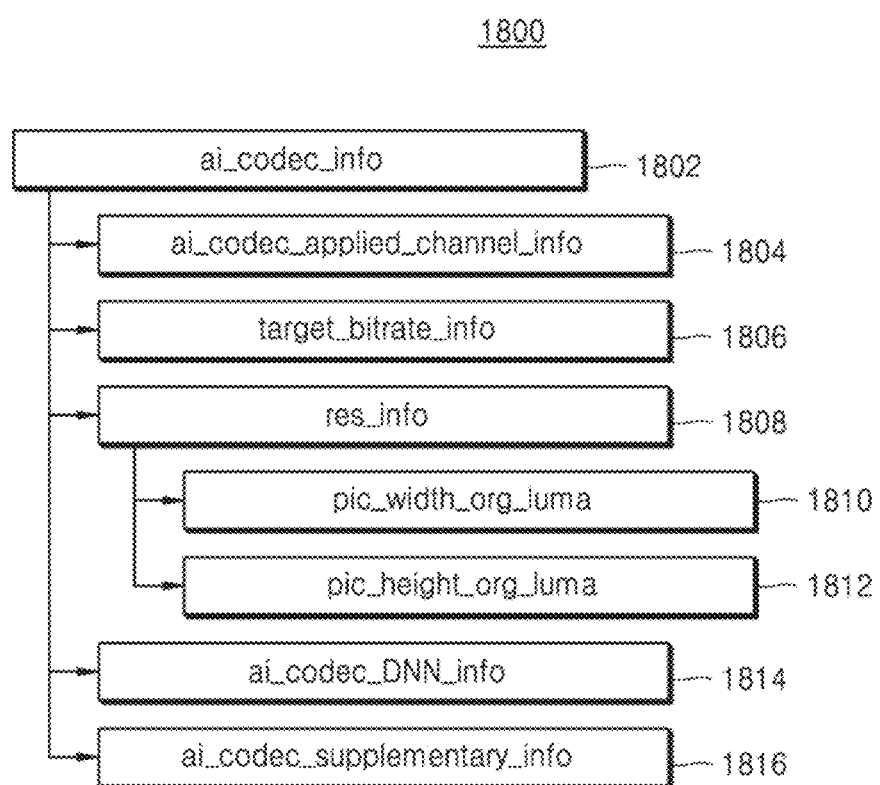
FIG. 18A illustrates an example of a data structure applicable to video AI data described in FIGS. 14 through 17.

FIG. 18A illustrates an example of a data structure 1800 applicable to video AI data described in FIGS. 14 through 17.

The data structure 1800 of the video AI data includes elements related to up-scaling DNN information used for AI up-scaling. The elements may include ai_codec_info 1802, ai_codec_applied_channel_info 1804, target_bitrate_info 1806, res_info 1808, ai_codec_DNN_info 1814, and ai_codec_supplementary_info 1816. An arrangement order of the elements shown in FIG. 18A is only an example and one of ordinary skill in the art may change and execute the arrangement order of the elements.

According to an embodiment of the disclosure, the ai_codec_info 1802 denote AI target data indicating whether AI up-scaling is to be applied to a low resolution image. When the ai_codec_info 1802 indicates that AI up-scaling is applied to a low resolution image reconstructed according to image data, the data structure 1800 includes AI supplementary data for obtaining up-scaling DNN information used for the AI up-scaling. On the other hand, when the ai_codec_info 1802 indicates that AI up-scaling is not applied to the low resolution image reconstructed according to the image data, the data structure 1800 may not include the AI supplementary data regarding the AI up-scaling. The AI supplementary data includes the ai_codec_applied_channel_info 1804, the t, the res_info 1808, the ai_codec_DNN_info 1814, and the ai_codec_supplementary_info 1816.

The ai_codec_applied_channel_info 1804 is channel information indicating a color channel to which AI up-scaling is applied. An image may be represented in an RGB format, a YUV format, or a YCbCr format. When the low resolution image reconstructed from the image data is in the YCbCr format, the low resolution image includes a low resolution image of a Y channel regarding luminance, a low resolution image of a Cb channel regarding chrominance, and a low resolution image of a Cr channel. The ai_codec_applied_channel_info 1804 may indicate a color channel to which AI up-scaling is applied among three channels. Also, the AI up-scaler 234 may AI up-scale a low resolution image of a color channel indicated by the ai_codec_applied_channel_info 1804. The AI up-scaler 234 may obtain different pieces of up-scaling DNN information for each color channel.

According to an embodiment of the disclosure, AI up-scaling may be applied only to the low resolution image of the Y channel regarding luminance to reduce throughput according to AI up-scaling. Because human eyes are more sensitive to image quality with respect to luminance rather than chrominance, a difference in people's subjective sense of image quality may be insignificant between when a low resolution image of all color channels is AI up-scaled and when only a low resolution image of a Y channel is AI up-scaled.

Thus, the ai_codec_applied_channel_info 1804 may indicate whether the low resolution image of the Cb channel and the low resolution image of the Cr channel are AI up-scaled. When the ai_codec_applied_channel_info 1804 indicates that the low resolution image of the Cb channel and the low resolution image of the Cr channel are not AI up-scaled, the AI up-scaler 234 may apply AI up-scaling only on the low resolution image of the Y channel. On the other hands, when the ai_codec_applied_channel_info 1804 indicates that the low resolution image of the Cb channel and the low resolution image of the Cr channel are AI up-scaled, the AI up-scaler 234 may apply AI up-scaling on the low resolution images of all channels.

The target_bitrate_info 1806 is information indicating a bitrate of the image data obtained as a result of the first encoding performed by the first encoder 614. The AI up-scaler 234 may obtain up-scaling DNN information suitable for image quality of the low resolution image, according to the target_bitrate_info 1806.

The res_info 1808 indicates resolution image related to resolution of a high resolution image obtained via AI up-scaling, such as the third image 145. The res_info 1808 may include pic_width_org_luma 1810 and pic_height_org_luma 1812. The pic_width_org_luma 1810 and the pic_height_org_luma 1812 are high resolution image width information and high resolution image height information indicating the width and height of the high resolution image, respectively. The AI up-scaler 234 may determine an AI up-scaling rate according to the resolution of the high resolution image determined by the pic_width_org_luma 1810 and the pic_height_org_luma 1812, and the resolution of the low resolution image reconstructed by the first decoder 232.

According to an embodiment of the disclosure, the res_info 1808 may include resolution ratio information indicating a resolution ratio of the low resolution image and the high resolution image, instead of the pic_width_org_luma 1810 and the pic_height_org_luma 1812. Accordingly, the AI up-scaler 234 may determine the resolution of the high resolution image according to the resolution ratio according to the resolution ratio information and the resolution of the low resolution image reconstructed by the first decoder 232. The resolution ratio information may include vertical resolution ratio information and horizontal resolution ratio information.

The AI up-scaler 234 may obtain up-scaling DNN information suitable for AI up-scaling of the low resolution image, according to the AI up-scaling rate determined according to the res_info 1808. Alternatively, the AI up-scaler 234 may obtain the up-scaling DNN information suitable for AI up-scaling of the low resolution image, according to the resolution of the low resolution image and the resolution of the high resolution image determined according to the res_info 1808.

The ai_codec_DNN_info 1814 is information indicating pre-agreed up-scaling DNN information used for AI up-scaling of the low resolution image. The AI up-scaler 234 may determine one of a plurality of pieces of pre-stored default DNN configuration information as the up-scaling DNN information, according to the ai_codec_applied_channel_info 1804, the target_bitrate_info 1806, and the res_info 1808. Also, the AI up-scaler 234 may determine one of the plurality of pieces of pre-stored default DNN configuration information as the up-scaling DNN information additionally considering other features (a genre, maximum luminance, color gamut of an image, and the like) of the high resolution image.

When there are two or more pieces of default DNN configuration information matching a certain condition, the ai_codec_DNN_info 1814 may indicate one of the two or more pieces of default DNN configuration information. Also, the AI up-scaler 234 may AI up-scale the low resolution image by using up-scaling DNN information indicated by the ai_codec_DNN_info 1814.

According to an embodiment of the disclosure, when there are two or more pieces of default DNN configuration information matching a certain condition, the ai_codec_DNN_info 1814 may indicate two or more pieces of up-scaling DNN information applicable to a current video file among the two or more pieces of default DNN configuration information. Also, one of the two or more pieces of up-scaling DNN information indicated by the ai_codec_DNN_info 1814 may be adaptively selected in frame group or frame units.

The ai_codec_supplementary_info 1816 indicates supplementary information regarding AI up-scaling. The ai_codec_supplementary_info 1816 may include information required to determine up-scaling DNN information applied to a video. The ai_codec_supplementary_info 1816 may include information about a genre, high dynamic range (HDR) maximum luminance, HDR color gamut, HDR perceptual quantizer (PQ), codec, and a rate control type.

The ai_codec_applied_channel_info 1804, the target_bitrate_info 1806, the res_info 1808, the ai_codec_DNN_info 1814, and the ai_codec_supplementary_info 1816 of FIG. 18A may be partially omitted according to an embodiment of the disclosure. The video AI data having the data structure 1800 including the elements may be applied to all frame groups.

Figure 18B:
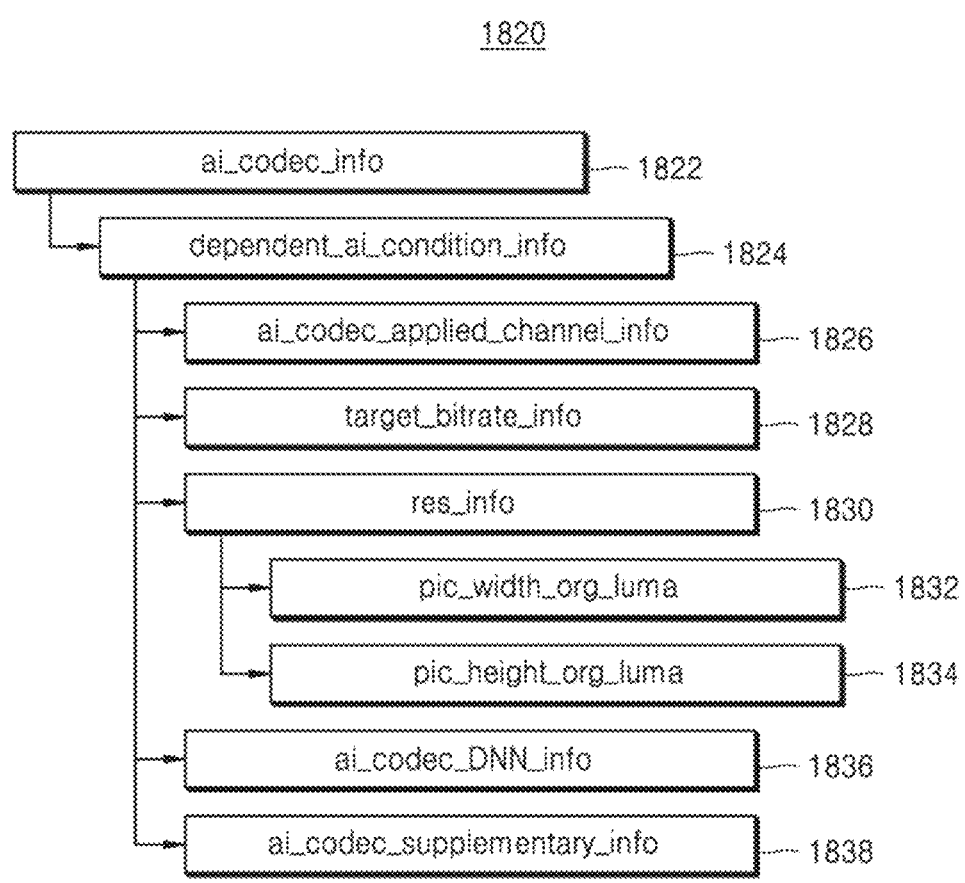
FIG. 18B illustrates an example of a data structure applicable to video segment AI data described in FIG. 16 or frame group AI data of FIGS. 14, 15A to 15C, and 17.

FIG. 18B illustrates an example of a data structure 1820 applicable to video segment AI data described in FIG. 16 or frame group AI data of FIGS. 14, 15A to 15C, and 17.

The data structure 1820 has a similar structure as the data structure 1800 of FIG. 18A. ai_codec_info 1822, ai_codec_applied_channel_info 1826, target_bitrate_info 1828, res_info 1830, pic_width_org_luma 1832, pic_height_org_luma 1834, ai_codec_DNN_info 1836, and ai_codec_supplementary_info 1838 of FIG. 18B may perform the same functions as the ai_codec_info 1802, the ai_codec_applied_channel_info 1804, the target_bitrate_info 1806, the res_info 1808, the pic_width_org_luma 1810, the pic_height_org_luma 1812, the ai_codec_DNN_info 1814, and the ai_codec_supplementary_info 1816 of FIG. 18A.

However, the data structure 1820 may additionally include AI supplementary data dependency information (dependent_ai_condition_info 1824) indicating whether AI supplementary data is the same between a consecutive previous data unit and a current data unit. The data structure 1820 may include the dependent_ai_condition_info 1824 when the ai_codec_info 1822 indicates that AI up-scaling is applied to a low resolution image. When the ai_codec_info 1822 indicates that AI up-scaling is not applied to the low resolution image, the dependent_ai_condition_info 1824 may be omitted from the data structure 1820.

When the dependent_ai_condition_info 1824 indicates that the AI supplementary data is the same between the consecutive previous data unit and the current data unit, the ai_codec_applied_channel_info 1826, the target_bitrate_info 1828, the res_info 1830, the pic_width_org_luma 1832, the pic_height_org_luma 1834, the ai_codec_DNN_info 1836, and the ai_codec_supplementary_info 1838 may be omitted from the data structure 1820. Also, channel information, target bitrate information, resolution information, DNN information, and supplementary information are determined from the ai_codec_applied_channel_info 1826, the target_bitrate_info 1828, the res_info 1830, the pic_width_org_luma 1832, the pic_height_org_luma 1834, the ai_codec_DNN_info 1836, and the ai_codec_supplementary_info 1838 of a previous data unit. Accordingly, when the same AI supplementary data is applied to a plurality of data units, the size of AI data may be reduced according to the dependent_ai_condition_info 1824.

When the dependent_ai_condition_info 1824 indicates that the AI supplementary data is not the same between the consecutive previous data unit and the current data unit, the data structure 1820 includes the ai_codec_applied_channel_info 1826, the target_bitrate_info 1828, the res_info 1830, the pic_width_org_luma 1832, the pic_height_org_luma 1834, the ai_codec_DNN_info 1836, and the ai_codec_supplementary_info 1838. Also, up-scaling DNN information of the current data unit may be independently obtained regardless of up-scaling DNN information of the previous data unit.

According to an embodiment of the disclosure, AI supplementary data dependency information of an initially transmitted data unit may be omitted. Thus, AI supplementary data dependency information is included in a video segment header from a video segment transmitted second.

According to an embodiment of the disclosure, the AI supplementary data dependency information may indicate only dependency of a certain AI supplementary data. For example, the AI supplementary data dependency information may indicate whether the current data unit inherits resolution information of the previous data unit. The AI data inherited according to the AI supplementary data dependency information may include at least one of the ai_codec_info 1822, the ai_codec_applied_channel_info 1804, the target_bitrate_info 1806, the res_info 1808, the ai_codec_DNN_info 1814, or the ai_codec_supplementary_info 1816.

In FIG. 18B, the data unit may be a video segment or frame group. When the data unit is a video segment, the dependent_ai_condition_info 1824 may indicate whether AI supplementary data is the same between a consecutive previous video segment and a current video segment. When the data unit is a frame group, the dependent_ai_condition_info 1824 may indicate whether AI supplementary data is the same between a consecutive previous frame group and a current frame group.

FIG. 19 illustrates a syntax table 1900 in which the data structure 1800 of FIG. 18A is implemented.

According to the syntax table 1900, syntax elements such as ai_codec_info, ai_codec_applied_channel_info, target_bitrate, pic_width_org_luma, pic_height_org_luma, ai_codec_DNN_info, and ai_codec_supplementary_info_flag are parsed.

The ai_codec_info is AI target data corresponding to the ai_codec_info 1802 of FIG. 18A. When the ai_codec_info indicates that AI up-scaling is allowed (if(ai_codec_info)), syntax elements corresponding to AI supplementary data are parsed. When the ai_codec_info indicates that AI up-scaling is not allowed, the syntax elements corresponding to the AI supplementary data are not parsed.

The syntax elements corresponding to the AI supplementary data include ai_codec_applied_channel_info, target_bitrate, pic_width_org_luma, pic_height_org_luma, ai_codec_DNN_info, and ai_codec_supplementary_info_flag.

The ai_codec_applied_channel_info corresponds to the ai_codec_applied_channel_info 1804 of FIG. 18A. The target_bitrate is target bitrate information corresponding to the target_bitrate_info 1806 of FIG. 18A. The pic_width_org_luma and the pic_height_org_luma are high resolution image width information and high resolution image height information corresponding to pic_width_org_luma 1810 and pic_height_org_luma 1812 of FIG. 18A, respectively. The ai_codec_DNN_info is DNN information corresponding to the ai_codec_DNN_info 1814 of FIG. 18A.

The ai_codec_supplementary_info_flag is a supplementary information flag indicating whether the ai_codec_supplementary_info 1816 of FIG. 18A is included in the syntax table 1900. When the ai_codec_supplementary_info_flag indicates that supplementary information used for AI up-scaling is not parsed, additional supplementary information is not obtained. However, when the ai_codec_supplementary_info_flag indicates that the supplementary information used for AI up-scaling is parsed (if(ai_codec_supplementary_info_flag)), the additional supplementary information is obtained.

The obtained additional supplementary information may include genre_info, hdr_max_luminance, hdr_color_gamut, hdr_pq_type, and rate_control_type. The genre_info indicates a genre of content of image data, the hdr_max_luminance indicates HDR maximum luminance applied to a high resolution image, the hdr_color_gamut indicates HDR gamut applied to the high resolution image, the hdr_pq_type indicates HDR PQ information applied to the high resolution image, and rate_control_type indicates a rate control type applied to image data obtained as a result of first encoding. According to an embodiment of the disclosure, a certain syntax element may be parsed among the syntax elements corresponding to the supplementary information.

The syntax table 1900 of FIG. 19 is only an example and some of the elements of the data structure 1800 of FIG. 18A may be included in the syntax table 1900. Also, an element that is not included in the data structure 1800 may be included in the syntax table 1900.

According to an embodiment of the disclosure, the syntax table 1900 of FIG. 19 may include AI supplementary data dependency information such as dependent_ai_condition_info, like the data structure 1820 of FIG. 18B. Accordingly, the syntax table 1900 to which the AI supplementary data dependency information is added may be applied to a video segment or frame group.

Figure 20:
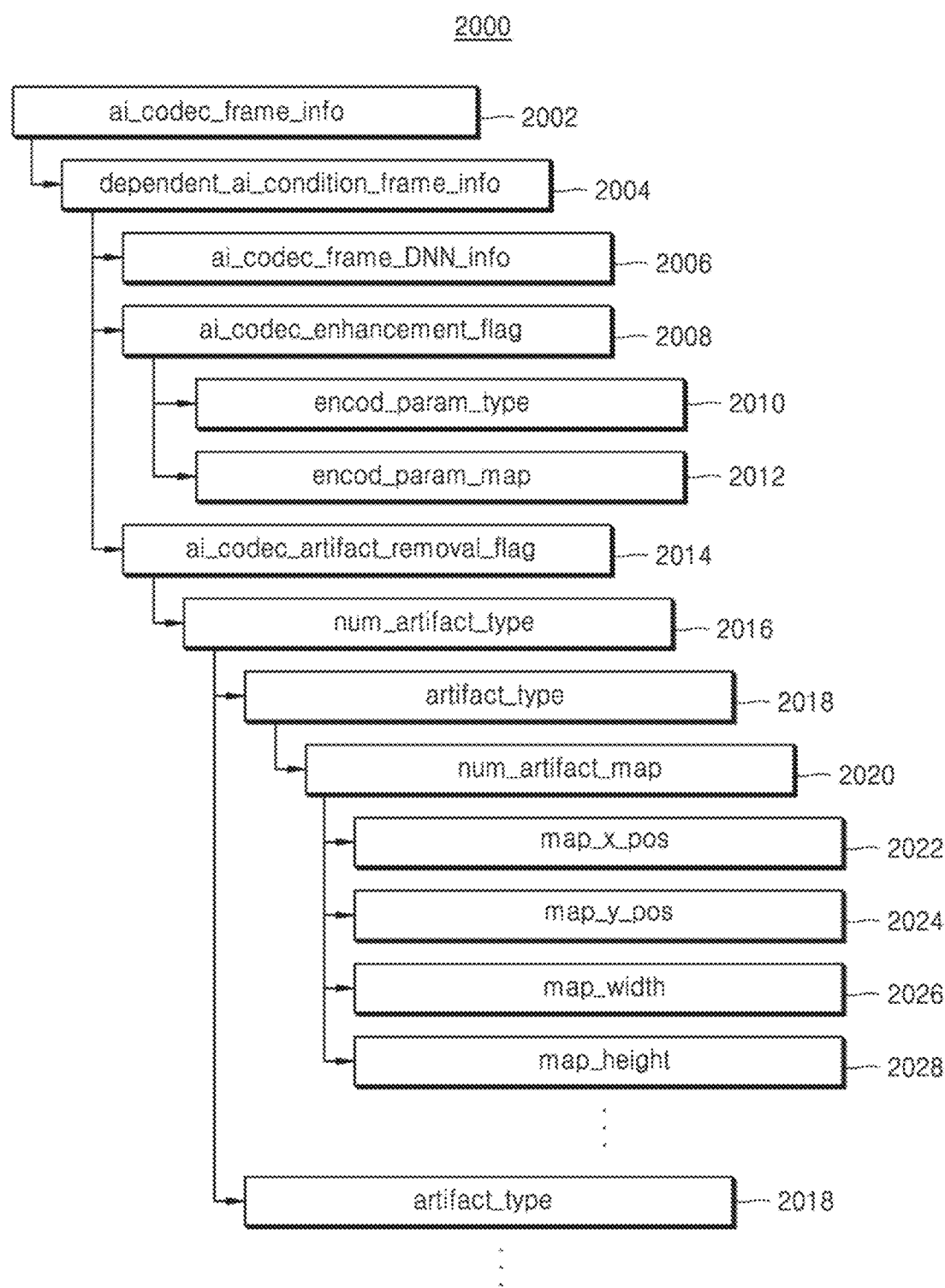
FIG. 20 illustrates an example of a data structure applicable to frame group AI data or frame AI data described in FIGS. 14 through 17.

FIG. 20 illustrates an example of a data structure 2000 applicable to (frame group AI data or) frame AI data described in FIGS. 14 through 17.

Elements for adaptively determining up-scaling DNN information in frame units are included in the data structure 2000. The elements may include ai_codec_frame_info 2002, dependent_ai_condition_frame_info 2004, ai_codec_frame_DNN_info 2006, ai_codec_enhancement_flag 2008, and ai_codec_artifact_removal_flag 2014. An arrangement order of the elements shown in FIG. 20 is only an example and one of ordinary skill in the art may change and execute the arrangement order of the elements.

The ai_codec_frame_info 2002 is frame AI target data indicating whether AI up-scaling is allowed for a current frame. According to the ai_codec_frame_info 2002, when AI up-scaling is allowed for the current frame, the data structure 2000 includes frame AI supplementary data related to AI up-scaling of the current frame. Otherwise, AI up-scaling is not applied to the current frame and the data structure 2000 does not include the frame AI supplementary data. The frame AI supplementary data denotes AI supplementary data applied to a frame.

According to an embodiment of the disclosure, when AI up-scaling is allowed for the current frame according to the ai_codec_frame_info 2002, the data structure 2000 may include the dependent_ai_condition_frame_info 2004. The dependent_ai_condition_frame_info 2004 is frame AI supplementary data dependency information indicating whether frame AI supplementary data is the same between a consecutive previous frame and the current frame. When the dependent_ai_condition_frame_info 2004 indicates that the frame AI supplementary data is the same between the consecutive previous frame and the current frame, the data structure 2000 may not include additional frame AI supplementary data regarding the current frame, and up-scaling DNN information of the current frame is determined to be the same as up-scaling DNN information of the previous frame. When the dependent_ai_condition_frame_info 2004 indicates that the frame AI supplementary data is not the same between the consecutive previous frame and the current frame, the data structure 2000 includes the additional frame AI supplementary data regarding the current frame, and the up-scaling DNN information of the current frame is obtained independently from the up-scaling DNN information of the previous frame. The additional frame AI supplementary data may include the ai_codec_frame_DNN_info 2006, the ai_codec_enhancement_flag 2008, and the ai_codec_artifact_removal_flag 2014.

The ai_codec_frame_DNN_info 2006 is frame DNN information indicating the up-scaling DNN information of the current frame from among a plurality of pieces of up-scaling DNN information regarding a higher data unit of the current frame. When the ai_codec_DNN_info 1814 of FIG. 18A indicates two or more pieces of up-scaling DNN information regarding a video, the ai_codec_frame_DNN_info 2006 may determine the up-scaling DNN information of the current frame from the two or more pieces of up-scaling DNN information. Alternatively, when the ai_codec_DNN_info 1836 of FIG. 18B indicates two or more pieces of up-scaling DNN information regarding a video segment or frame group, the ai_codec_frame_DNN_info 2006 may determine the up-scaling DNN information of the current frame from the two or more pieces of up-scaling DNN information. When the ai_codec_DNN_info 1814 of FIG. 18A or the ai_codec_DNN_info 1836 of FIG. 18B indicates only one piece of up-scaling DNN information, the ai_codec_frame_DNN_info 2006 may be omitted.

The ai_codec_enhancement_flag 2008 is AI enhancement information indicating whether an enhancement process of AI up-scaling accuracy is activated. When the ai_codec_enhancement_flag 2008 indicates that the enhancement process of the AI up-scaling accuracy is activated, some of samples of an AI up-scaled high resolution image are adjusted according to encoding parameter information. When the ai_codec_enhancement_flag 2008 indicates that the enhancement process of the AI up-scaling accuracy is not activated, the enhancement process is omitted.

An encoding parameter is generated when the original image 105 or the first image 115 is encoded at an encoding end. The encoding parameter may be generated according to prediction, transform, and in-loop filtering process of a data unit (largest coding unit, coding unit, prediction unit, transform unit, or pixel unit). The encoding parameter includes a motion vector, a prediction motion vector, an intra mode, residual signal-related information, and SAO parameter.

The encoding parameter information is information required for an enhancement process according to the encoding parameter. The encoding parameter information may include encoding parameter type information indicating a type of an encoding parameter referred to for the enhancement process and encoding parameter map information indicating an applied region of the enhancement process in the current frame.

When the ai_codec_enhancement_flag 2008 indicates that the enhancement process of the AI up-scaling accuracy is activated, the data structure 2000 may include encod_param_type 2010 that is the encoding parameter type information and encod_param_map 2012 that is the encoding parameter map information. For example, the encod_param_type 2010 may indicate the motion vector. Also, the encod_param_map 2012 may indicate the applied region of the enhancement process according to the motion vector in the AI up-scaled high resolution image. Also, pixels of the applied region may be modified according to the motion vector.

According to an embodiment of the disclosure, the encod_param_type 2010 may indicate two or more encoding parameters. Also, the encod_param_map 2012 may indicate the applied region of the enhancement process regarding each encoding parameter.

According to an embodiment of the disclosure, the encod_param_type 2010 and the encod_param_map 2012 may be omitted from the data structure 2000. Accordingly, one or more encoding parameters referred to in the enhancement process and the applied region of each encoding parameter may be pre-determined.

The ai_codec_artifact_removal_flag 2014 is artifact removal information indicating whether artifact removal of an AI up-scaled high resolution image is performed. For the artifact removal of the high resolution image, pixels of a low resolution image before AI up-scaling may be corrected or pixels of the high resolution image after AI up-scaling according to a second DNN may be corrected according to the artifact removal information, thereby removing artifact.

The artifact removal information may include artifact type information indicating an artifact type and artifact map information indicating an artifact region where artifact is located. Also, the artifact removal information may include artifact type number information indicating the number of artifact types of an image. Accordingly, the data structure 2000 may include the numbers of pieces of artifact type information and the artifact map information equal to the number according to the artifact type number information.

The artifact type includes contour artifact, ringing artifact, and aliasing artifact. Also, one or more artifact regions are determined for each artifact type. For example, one or more artifact regions may be determined for contour artifact and one or more artifact regions may be determined for ringing artifact.

When the ai_codec_artifact_removal_flag 2014 indicates that artifact removal of the AI up-scaled high resolution image is performed, the data structure 2000 may include num_artifact_type 2016 that is the artifact type number information. When the ai_codec_artifact_removal_flag 2014 indicates that artifact removal of the AI up-scaled high resolution image is not performed, the num_artifact_type 2016 is omitted from the data structure 2000.

The data structure 2000 may include artifact_type 2018 that is the artifact type information as much as the number indicated by the num_artifact_type 2016. Also, the data structure 2000 may include the artifact map information for each artifact_type 2018. The artifact map information of the data structure 2000 may include num_artifact_map 2020 indicating the number of artifact regions. Also, the data structure 2000 may include map_x_pos 2022, map_y_pos 2024, map_width 2026, map_height 2028 indicating a location and size of each artifact region.

According to an embodiment of the disclosure, some of the dependent_ai_condition_frame_info 2004, the ai_codec_frame_DNN_info 2006, the ai_codec_enhancement_flag 2008, and the ai_codec_artifact_removal_flag 2014 of FIG. 20 may be omitted from the data structure 2000.

According to an embodiment of the disclosure, the data structure 2000 of FIG. 20 may be applied to a frame group instead of the frame. When the data structure 2000 is applied to the frame group, the same up-scaling DNN information, the same AI enhancement information, and the same artifact removal information may be applied to all frames included in the frame group. Also, when the data structure 2000 is applied to the frame group, the data structure 2000 may include ai_codec_frame_group_info, dependent_ai_condition_frame_group_info, and ai_codec_frame_group_DNN_info applied to the frame group instead of the ai_codec_frame_info 2002, the dependent_ai_condition_frame_info 2004, and the ai_codec_frame_DNN_info 2006. Also, the ai_codec_enhancement_flag 2008, the encod_param_type 2010, the encod_param_map 2012, the ai_codec_artifact_removal_flag 2014, the num_artifact_type 2016, the artifact_type 2018, the num_artifact_map 2020, the map_x_pos 2022, the map_y_pos 2024, the map_width 2026, and the map_height 2028 may be applied to all frames of the frame group.

According to an embodiment of the disclosure, the data structure 1800 of FIG. 18A may be applied to video AI data. Also, the data structure 2000 of FIG. 20 may be applied to frame AI data. The video AI data according to the data structure 1800 includes AI data commonly applied to all frames, and the frame AI data according to the data structure 2000 includes AI data adaptively applied to a frame.

According to an embodiment of the disclosure, the data structure 1800 of FIG. 18A may be applied to video AI data. Also, the data structure 2000 of FIG. 20 may be applied to frame group AI data. The video AI data according to the data structure 1800 includes AI data commonly applied to all frames, and the frame group AI data according to the data structure 2000 includes AI data adaptively applied to a frame group. Also, the same AI data is applied to all frames included in the frame group.

According to an embodiment of the disclosure, the data structure 1820 of FIG. 18B may be applied to video segment AI data or frame group AI data. Also, the data structure 2000 of FIG. 20 may be applied to frame AI data. The video segment AI data or the frame group AI data according to the data structure 1820 includes AI data commonly applied to all frames of a video segment or a frame group, and the frame AI data according to the data structure 2000 includes AI data adaptively applied to a frame.

According to an embodiment of the disclosure, the data structure 1820 of FIG. 18B may be applied to video segment AI data. Also, the data structure 2000 of FIG. 20 may be applied to frame group AI data. The video segment AI data according to the data structure 1820 includes AI data commonly applied to all frames of a video segment, and the frame group AI data according to the data structure 2000 includes AI data adaptively applied to a frame group. Also, the same AI data is applied to all frames included in the frame group.

FIG. 21 illustrates a syntax table 2100 in which the data structure 2000 of FIG. 20 is implemented.

According to the syntax table 2100, syntax elements such as ai_codec_frame_info, dependent_ai_condition_frame_info, ai_codec_frame_DNN_info, ai_codec_enhancement_flag, and ai_codec_artifact_removal_flag are parsed.

The ai_codec_frame_info is frame AI target data corresponding to the ai_codec_frame_info 2002 of FIG. 20. When the ai_codec_frame_info indicates that AI up-scaling is allowed (if(ai_codec_frame_info)), syntax elements corresponding to frame AI supplementary data are parsed. When the ai_codec_frame_info indicates that AI up-scaling is not allowed, the syntax elements corresponding to the frame AI supplementary data are not parsed.

The syntax elements corresponding to the frame AI supplementary data may include dependent_ai_condition_frame_info, ai_codec_frame_DNN_info, ai_codec_enhancement_flag, and ai_codec_artifact_removal_flag. The dependent_ai_condition_frame_info, the ai_codec_frame_DNN_info, the ai_codec_enhancement_flag, and the ai_codec_artifact_removal_flag of FIG. 21 correspond to the dependent_ai_condition_frame_info 2004, the ai_codec_frame_DNN_info 2006, the ai_codec_enhancement_flag 2008, and the ai_codec_artifact_removal_flag 2014 of FIG. 20.

When the ai_codec_frame_info indicates that AI up-scaling is allowed, dependent_ai_condition_frame_info is obtained. When the dependent_ai_condition_frame_info indicates that the frame AI supplementary data is the same between a consecutive previous frame and a current frame, up-scaling DNN information of the current frame is determined to be the same as up-scaling DNN information of the previous frame. When the dependent_ai_condition_frame_info indicates that the frame AI supplementary data is not the same between the consecutive previous frame and the current frame, up-scaling DNN information, AI enhancement information, and artifact removal information of the current frame are determined according to ai_codec_frame_DNN_info, ai_codec_enhancement_flag, and ai_codec_artifact_removal_flag.

The ai_codec_frame_DNN_info indicates the up-scaling DNN information of the current frame among a plurality of pieces of up-scaling DNN information regarding a higher data unit of the current frame.

The ai_codec_enhancement_flag indicates whether an enhancement process of AI up-scaling accuracy is activated. When the ai_codec_enhancement_flag indicates that the enhancement process is activated (if(ai_codec_enhancement_flag)), encod_param_type indicating an encoding parameter type and encod_param_map indicating an encoding parameter region are obtained.

The ai_codec_artifact_removal_flag indicates whether artifact removal of an AI up-scaled high resolution image is performed. When the ai_codec_artifact_removal_flag indicates that the artifact removal of the high resolution image is performed (if(ai_codec_artifact_removal_flag)), num_artifact_type indicating the number of artifact types is obtained. artifact_type indicating an artifact type and num_artifact_map indicating the number of artifact regions are obtained as much as the number indicated by the num_artifact_type (for(i=0; i<num_artifact_type; i++)). Also, map_x_pos, map_y_pos, map_width, and map_height indicating a location and size of an artifact region are obtained as much as the number of num_artifact_map (for (i=0; i<num_artifact map; i++)).

The syntax table 2100 of FIG. 21 is only an example and some of elements of the data structure 2000 of FIG. 20 may be included in the syntax table 2100. Also, an element not included in the data structure 2000 may be included in the syntax table 2100.

Figure 22:
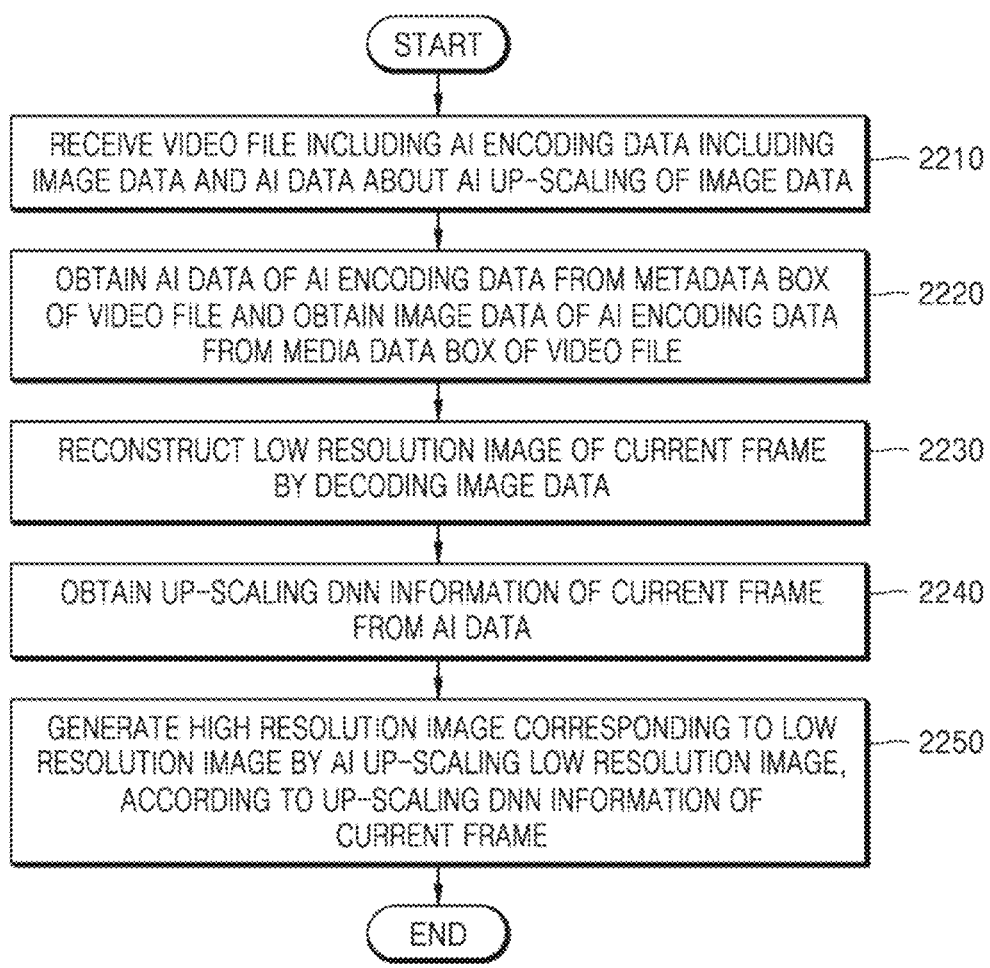
FIG. 22 is a flowchart of an image decoding method according to an AI decoder, according to the disclosure.

FIG. 22 is a flowchart of an image decoding method according to an AI decoder, according to an embodiment of the disclosure.

In operation 2210, a video file including AI encoding data including image data and AI data about AI up-scaling of the image data is received. The receiving of the AI encoding data in operation 2210 may be performed by the communicator 212.

In operation 2220, the AI data of the AI encoding data is obtained from a metadata box of the video file and the image data of the AI encoding data is obtained from a media data box of the video file. When the image data and the AI data are separated, the obtaining of the image data and the AI data in operation 2220 may be performed by the parser 214. Alternatively, when the AI data is included in the image data, the AI data may be obtained from the image data by the first decoder 232.

According to an embodiment of the disclosure, the AI encoding data may include synchronization data about synchronization of the image data and the AI data. The synchronization data may indicate a relationship between the image data and the AI data according to a decoding order or reproduction order of the image data. The synchronization data may include information about synchronization of a video header and video AI data, synchronization of a frame group header and frame group AI data, and synchronization of a frame header and frame AI data.

In operation 2230, a low resolution image of a current frame is reconstructed by decoding the image data. The reconstructing of the low resolution image according to operation 2230 may be performed by the first decoder 232.

In operation 2240, up-scaling DNN information of the current frame is obtained from the AI data. The obtaining of the up-scaling DNN information of the current frame according to operation 2240 may be performed by the AI up-scaler 234.

According to an embodiment of the disclosure, the AI data may include video AI data, frame group AI data, and frame AI data according to a layer structure of the AI data of FIG. 12. In addition, the AI data may include video segment AI data of FIG. 16. The AI data according to the layer structure may include up-scaling DNN information applied to a corresponding layer.

According to an embodiment of the disclosure, the AI data may include the video AI data. When only the video AI data is included in the AI data, up-scaling DNN information applied to all frames of the image data may be obtained from a plurality of pieces of default DNN configuration information according to the video AI data.

According to an embodiment of the disclosure, the AI data may include the frame group AI data. When only the frame group AI data is included in the AI data, up-scaling DNN information applied to all frames of the frame group may be obtained adaptively to the frame group from a plurality of pieces of default DNN configuration information according to the frame group AI data.

According to an embodiment of the disclosure, the AI data may include the frame AI data. When only the frame AI data is included in the AI data, up-scaling DNN information applied to the frame may be obtained adaptively to the frame from a plurality of pieces of default DNN configuration information according to the frame AI data.

According to an embodiment of the disclosure, the AI data may include the frame group AI data together with the video AI data. When only the video AI data and the frame group AI data are included in the AI data, one or more pieces of up-scaling DNN information may be obtained from a plurality of pieces of default DNN configuration information according to the video AI data. Also, up-scaling DNN information applied to frames of the frame group may be selected from the one or more pieces of up-scaling DNN information according to the frame group AI data.

According to an embodiment of the disclosure, the AI data may include the frame AI data together with the video AI data. When only the video AI data and the frame AI data are included in the AI data, one or more pieces of up-scaling DNN information may be obtained from a plurality of pieces of default DNN configuration information according to the video AI data. Also, up-scaling DNN information applied to the frame may be selected from the one or more pieces of up-scaling DNN information according to the frame AI data.

According to an embodiment of the disclosure, the AI data may include the frame AI data together with the frame group AI data. When only the frame group AI data and the frame AI data are included in the AI data, one or more pieces of up-scaling DNN information may be obtained from a plurality of pieces of default DNN configuration information according to the frame group AI data. Also, up-scaling DNN information applied to the frame may be selected from the one or more pieces of up-scaling DNN information according to the frame AI data.

According to an embodiment of the disclosure, the AI data may include the video segment AI data. When only the video segment AI data is included in the AI data, up-scaling DNN information applied to all frames of the video segment may be obtained from a plurality of pieces of default DNN configuration information according to the video segment AI data.

According to an embodiment of the disclosure, the AI data may include the video AI data together with the video segment AI data. When only the video AI data and the video segment AI data are included in the AI data, one or more pieces of up-scaling DNN information may be obtained from a plurality of pieces of default DNN configuration information according to the video AI data. Also, up-scaling DNN information applied to all frames of the video segment may be selected from the one or more pieces of up-scaling DNN information according to the video segment AI data.

According to an embodiment of the disclosure, the AI data may include the frame group AI data or the frame AI data together with the video segment AI data. When the frame group AI data or the frame AI data is included in the AI data together with the video segment AI data, one or more pieces of up-scaling DNN information may be obtained from a plurality of pieces of default DNN configuration information according to the video segment AI data. Also, up-scaling DNN information applied to the frame group or the frame may be selected from the one or more pieces of up-scaling DNN information according to the frame group AI data or the frame AI data.

According to an embodiment of the disclosure, the AI data may include all of the video AI data, the video segment AI data, the frame group AI data, and the frame AI data. When the AI data includes all of the video AI data, the video segment AI data, the frame group AI data, and the frame AI data, one or more pieces of up-scaling DNN information applicable to a video may be limited from a plurality of pieces of default DNN configuration information according to the video AI data. Also, one or more pieces of up-scaling DNN information applicable to the video segment may be selected from the one or more pieces of up-scaling DNN information applicable to the video, according to the video segment AI data. Also, one or more pieces of up-scaling DNN information applicable to the frame group may be selected from the one or more pieces of up-scaling DNN information applicable to the video segment, according to the frame group AI data. Also, up-scaling DNN information applied to the frame may be selected from the one or more pieces of up-scaling DNN information applicable to the frame group, according to the frame AI data. According to the above embodiment of the disclosure, some of the video AI data, the video segment AI data, the frame group AI data, and the frame AI data may be excluded from a hierarchical AI data structure described above.

According to an embodiment of the disclosure, the AI data may include AI target data indicating whether AI up-scaling is to be applied, and when the AI up-scaling is applied, AI supplementary data about up-scaling DNN information used in the AI up-scaling.

The video AI data may include video AI target data indicating whether AI up-scaling is to be applied to the image data and video AI supplementary data about one or more pieces of up-scaling DNN information applicable to AI up-scaling of frames included in the image data. When the video AI target data indicates that AI up-scaling is applied to the frames included in the image data, one or more pieces of up-scaling DNN information are obtained according to the video AI supplementary data.

The video segment AI data may include video segment AI target data indicating whether AI up-scaling is to be applied to the video segment and video segment AI supplementary data about one or more pieces of up-scaling DNN information applicable to AI up-scaling of frames included in the video segment. When the video segment AI target data indicates that AI up-scaling is applied to the frames included in the video segment, one or more pieces of up-scaling DNN information of the video segment are obtained according to the video segment AI supplementary data.

The frame group AI data may include frame group AI target data indicating whether AI up-scaling is to be applied to the frame group and frame group AI supplementary data about one or more pieces of up-scaling DNN information applicable to AI up-scaling of frames included in the frame group. When the frame group AI target data indicates that AI up-scaling is applied to the frames included in the frame group, one or more pieces of up-scaling DNN information of the frame group are obtained according to the frame group AI supplementary data.

The frame AI data may include frame AI target data indicating whether AI up-scaling is to be applied to the frame and frame AI supplementary data about up-scaling DNN information used for AI up-scaling of the frame. When the frame AI target data indicates that AI up-scaling is applied to the current frame, up-scaling DNN information of the current frame is obtained according to the frame AI supplementary data.

According to an embodiment of the disclosure, the video segment AI data may include video segment AI supplementary data dependency information indicating whether video segment AI supplementary data is the same between a consecutive previous video segment and the current video segment. When the video segment AI supplementary data dependency information indicates that the video segment AI supplementary data is the same between the consecutive previous video segment and the current video segment, the video segment AI supplementary data of the current video segment is determined to be the same as the video segment AI supplementary data of the previous video segment.

Also, the frame group AI data may include frame group AI supplementary data dependency information indicating whether frame group AI supplementary data is the same between a consecutive previous frame group and the current frame group. When the frame group AI supplementary data dependency information indicates that the frame group AI supplementary data is the same between the consecutive previous frame group and the current frame group, the frame group AI supplementary data of the current frame group is determined to be the same as the frame group AI supplementary data of the previous frame group.

Also, the frame AI data may include frame AI supplementary data dependency information indicating whether frame AI supplementary data is the same between a consecutive previous frame and the current frame. When the frame AI supplementary data dependency information indicates that the frame AI supplementary data is the same between the consecutive previous frame and the current frame, the frame AI supplementary data of the current frame may be determined to be the same as the frame AI supplementary data of the previous frame.

According to an embodiment of the disclosure, the video AI data applied to the entire image data, the video segment AI data corresponding to the video segment, the frame group AI data applied to the frame group, and the frame AI data applied to the frame may be determined according to synchronization data.

According to an embodiment of the disclosure, the AI data may include channel information indicating a color channel to which AI up-scaling is applied. Also, up-scaling DNN information may be obtained for the color channel indicated by the channel information.

According to an embodiment of the disclosure, the AI data may include at least one of target bitrate information indicating a bitrate of the low resolution image according to the image data or resolution information related to resolution of an AI up-scaled high resolution image. Also, two or more pieces of up-scaling DNN information regarding the video, the video segment, or the frame group may be determined according to at least one of the target bitrate information or the resolution information. Also, up-scaling DNN information of the current frame may be determined from the two or more pieces of up-scaling DNN information, according to the frame AI data.

In operation 2250, a high resolution image corresponding to the low resolution image is generated by AI up-scaling the low resolution image according to the up-scaling DNN information of the current frame. The generating of the high resolution image according to operation 2250 may be performed by the AI up-scaler 234.

According to an embodiment of the disclosure, accuracy of the generated high resolution image may be enhanced according to an AI up-scaling enhancement process according to the encoding parameter. Alternatively, artifact of the generated high resolution image may be removed according to an artifact removal process.

Functions of the AI up-scaling described with reference to FIGS. 12 through 21 may be applied to the image decoding method of FIG. 22.

Figure 23:
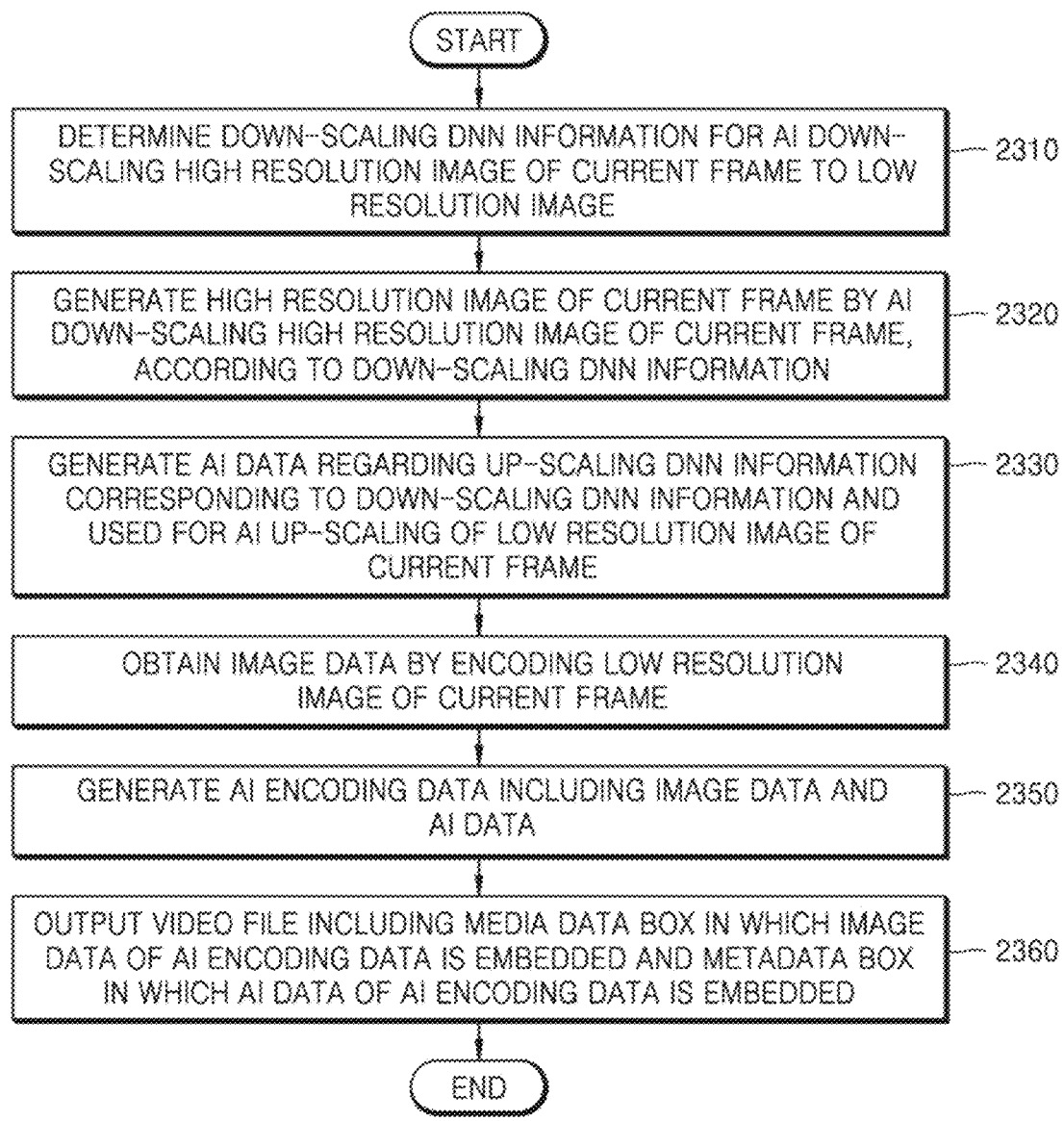
FIG. 23 is a flowchart of an image encoding method according to an AI encoder, according to the disclosure.

FIG. 23 is a flowchart of an image encoding method according to an AI encoder, according to an embodiment of the disclosure.

In operation 2310, down-scaling DNN information for AI down-scaling a high resolution image of a current frame to a low resolution image is determined. The determining of the AI data according to operation 2310 may be performed by the AI down-scaler 612.

Two or more pieces of down-scaling DNN information may be determined for a video, a video segment, or a frame group, according to at least one of target bitrate information or resolution information. Also, the down-scaling DNN information of the current frame may be determined from the two or more pieces of down-scaling DNN information, according to frame AI data.

In operation 2320, the low resolution image of the current frame is generated by AI down-scaling the high resolution image of the current frame, by using the down-scaling DNN information. The generating of the low resolution image according to operation 2320 may be performed by the AI down-scaler 612.

In operation 2330, AI data used for AI up-scaling of the low resolution image of the current frame is generated. The generating of the low resolution image according to operation 2330 may be performed by the AI down-scaler 612. The AI data used for AI up-scaling may be generated by referring to the down-scaling DNN information generated in operation 2310.

According to an embodiment of the disclosure, the AI data may include video AI data, frame group AI data, and frame AI data according to a layer structure of the AI data of FIG. 12. In addition, the AI data may include video segment AI data of FIG. 16. The AI data according to the layer structure may include up-scaling DNN information applied to a corresponding layer.

According to an embodiment of the disclosure, the AI data may include the video AI data. When only the video AI data is included in the AI data, the video AI data may indicate up-scaling DNN information applied to all frames of the image data from a plurality of pieces of default DNN configuration information.

According to an embodiment of the disclosure, the AI data may include the frame group AI data. When only the frame group AI data is included in the AI data, the frame group AI data may indicate up-scaling DNN information applied to all frames of the frame group from a plurality of pieces of default DNN configuration information.

According to an embodiment of the disclosure, the AI data may include the frame AI data. When only the frame AI data is included in the AI data, the frame AI data may indicate up-scaling DNN information applied to a frame from a plurality of pieces of default DNN configuration information.

According to an embodiment of the disclosure, the AI data may include the frame group AI data together with the video AI data. When only the video AI data and the frame group AI data are included in the AI data, the video AI data may include one or more pieces of up-scaling DNN information from a plurality of pieces of default DNN configuration information. Also, up-scaling DNN information applied to frames of the frame group may be indicated from the one or more pieces of up-scaling DNN information according to the frame group AI data.

According to an embodiment of the disclosure, the AI data may include the frame AI data together with the video AI data. When only the video AI data and the frame AI data are included in the AI data, the video AI data may include one or more pieces of up-scaling DNN information from a plurality of pieces of default DNN configuration information. Also, the frame AI data may indicate up-scaling DNN information applied to the frame from the one or more pieces of up-scaling DNN information.

According to an embodiment of the disclosure, the AI data may include the frame AI data together with the frame group AI data. When only the frame group AI data and the frame AI data are included in the AI data, the frame group AI data may indicate one or more pieces of up-scaling DNN information from a plurality of pieces of default DNN configuration information. Also, the frame AI data may indicate up-scaling DNN information applied to the frame from the one or more pieces of up-scaling DNN information.

According to an embodiment of the disclosure, the AI data may include the video segment AI data. When only the video segment AI data is included in the AI data, the video segment AI data may indicate up-scaling DNN information applied to all frames of the video segment from a plurality of pieces of default DNN configuration information.

According to an embodiment of the disclosure, the AI data may include the video AI data together with the video segment AI data. When only the video AI data and the video segment AI data are included in the AI data, the video AI data may include one or more pieces of up-scaling DNN information from a plurality of pieces of default DNN configuration information. Also, the video segment AI data may indicate up-scaling DNN information applied to all frames of the video segment from the one or more pieces of up-scaling DNN information.

According to an embodiment of the disclosure, the AI data may include the frame group AI data or the frame AI data together with the video segment AI data. When the frame group AI data or the frame AI data is included in the AI data together with the video segment AI data, the video segment AI data may indicate one or more pieces of up-scaling DNN information from a plurality of pieces of default DNN configuration information. Also, the frame group AI data or the frame AI data may indicate up-scaling DNN information applied to the frame group or the frame from the one or more pieces of up-scaling DNN information.

According to an embodiment of the disclosure, the AI data may include all of the video AI data, the video segment AI data, the frame group AI data, and the frame AI data. When the AI data includes all of the video AI data, the video segment AI data, the frame group AI data, and the frame AI data, the video AI data may indicate one or more pieces of up-scaling DNN information applicable to a video from a plurality of pieces of default DNN configuration information. Also, the video segment AI data may indicate one or more pieces of up-scaling DNN information applicable to the video segment from the one or more pieces of up-scaling DNN information applicable to the video. Also, the frame group AI data may indicate one or more pieces of up-scaling DNN information applicable to the frame group from the one or more pieces of up-scaling DNN information applicable to the video segment. Also, the frame AI data may indicate up-scaling DNN information applied to the frame from the one or more pieces of up-scaling DNN information applicable to the frame group. According to the above embodiment of the disclosure, one of the video AI data, the video segment AI data, the frame group AI data, and the frame AI data may be excluded from a hierarchical AI data structure described above.

According to an embodiment of the disclosure, the AI data may include AI target data indicating whether AI up-scaling is to be applied. Also, when AI up-scaling is applied, the AI data may include AI supplementary data about up-scaling DNN information corresponding to the down-scaling DNN information used for AI down-scaling.

The video AI data may include video AI target data indicating whether AI up-scaling is to be applied to the image data and video AI supplementary data about one or more pieces of up-scaling DNN information applicable to AI up-scaling of frames included in the image data. The video AI target data may be determined based on whether AI up-scaling is to be applied to the image data. Also, the video AI supplementary data may be determined according to one or more pieces of up-scaling DNN information of frames included in the image data.

The video segment AI data may include video segment AI target data indicating whether AI up-scaling is to be applied to the video segment and video segment AI supplementary data about one or more pieces of up-scaling DNN information applicable to AI up-scaling of frames included in the video segment. The video segment AI target data may be determined based on whether AI up-scaling is to be applied to the video segment. The video segment AI supplementary data may be determined according to one or more pieces of up-scaling DNN information of frames included in the video segment.

The frame group AI data may include frame group AI target data indicating whether AI up-scaling is to be applied to the frame group and frame group AI supplementary data about one or more pieces of up-scaling DNN information applicable to AI up-scaling of frames included in the frame group. The frame group AI target data may be determined based on whether AI up-scaling is to be applied to the frame group. Also, the frame group AI supplementary data may be determined according to one or more pieces of up-scaling DNN information applicable to AI up-scaling of frames included in the frame group.

The frame AI data may include frame AI target data indicating whether AI up-scaling is to be applied to the frame and frame AI supplementary data about up-scaling DNN information used for AI up-scaling of the frame.

The frame AI target data may be determined based on whether AI up-scaling is to be applied to the current frame. The frame AI supplementary data may be determined according to up-scaling DNN information used for AI up-scaling of the current frame.

According to an embodiment of the disclosure, the video segment AI data may include video segment AI supplementary data dependency information indicating whether video segment AI supplementary data is the same between a consecutive previous video segment and the current video segment. The video segment AI supplementary data dependency information is determined based on whether video segment AI supplementary data is same between a consecutive previous video segment and the current video segment.

Also, the frame group AI data may include frame group AI supplementary data dependency information indicating whether frame group AI supplementary data is the same between a consecutive previous frame group and the current frame group. The frame group AI supplementary data dependency information is determined based on whether frame group AI supplementary data is same between a consecutive previous frame group and the current frame group.

Also, the frame AI data may include frame AI supplementary data dependency information indicating whether frame AI supplementary data is the same between a consecutive previous frame and the current frame. The frame AI supplementary data dependency information is determined based on whether frame AI supplementary data is same between a consecutive previous frame and the current frame.

According to an embodiment of the disclosure, AI encoding data may include synchronization data about synchronization of the image data and the AI data. The synchronization data may include data regarding synchronization of the image data and the video AI data, synchronization of the video segment and the video segment AI data, synchronization of the frame group and the frame group AI data, and synchronization of the current frame and the frame AI data.

According to an embodiment of the disclosure, the AI data may include channel information indicating a color channel applied to AI up-scaling of the current frame. Also, up-scaling DNN information may be determined for the color channel indicated by the channel information.

According to an embodiment of the disclosure, the AI data may include at least one of target bitrate information indicating a bitrate of the low resolution image or resolution information indicating resolution of the high resolution image.

In operation 2340, image data is obtained by encoding the low resolution image of the current frame. The obtaining of the image data according to operation 2340 may be performed by the first encoder 614.

In operation 2350, AI encoding data including the image data and the AI data is generated. The generating of the AI encoding data according to operation 2350 may be performed by the data processor 632. According to an embodiment of the disclosure, the image data and the AI data may not be included in a single file but may be configured as separate files.

In operation 2360, a video file including a media data box in which the image data of the generated AI encoding data is embedded and a metadata box in which the AI data of the AI encoding data is embedded is output. The outputting of the AI encoding data according to operation 2360 may be performed by the communicator 634.

Functions of the AI down-scaling corresponding to the AI up-scaling described with reference to FIGS. 12 through 21 may be applied to the image encoding method of FIG. 23.

Figure 24:
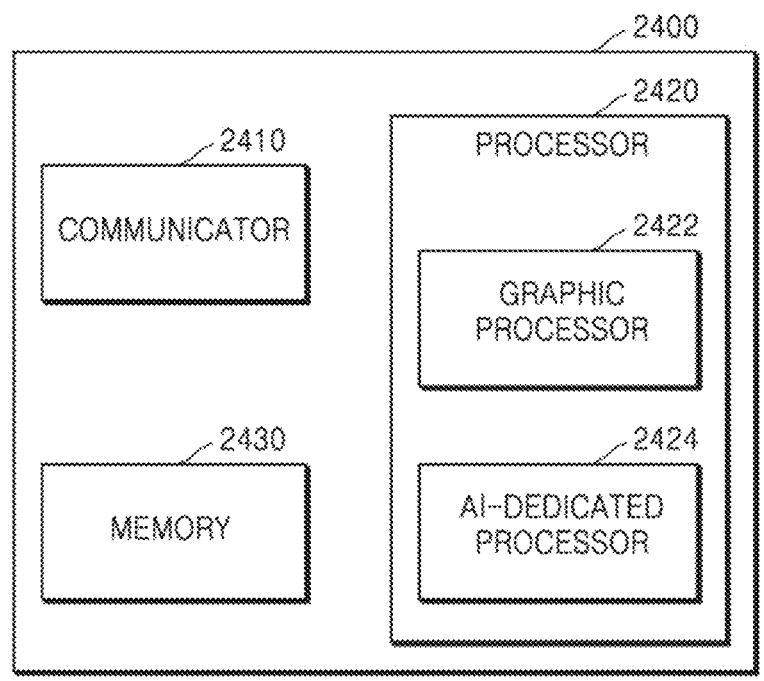
FIG. 24 is a block diagram showing a configuration of an image decoding apparatus, according to the disclosure.

FIG. 24 is a block diagram showing a configuration of an image decoding apparatus, according to an embodiment of the disclosure.

Referring to FIG. 24, an image decoding apparatus 2400 according to an embodiment of the disclosure may include a communicator 2410, a processor 2420, and a memory 2430.

The communicator 2410 may receive AI encoding data. Alternatively, the communicator 2410 may receive AI data and image data from an external device (for example, a server) according to control of the processor 2420.

The processor 2420 may control the image decoding apparatus 2400 in general. The processor 2420 according to an embodiment of the disclosure may execute one or more programs stored in the memory 2430. The processor 2420 may perform functions of the first decoder 232 and the AI up-scaler 234. The processor 2420 may be configured as one or more general-purpose processors.

According to an embodiment of the disclosure, the processor 2420 may include a graphic processor 2422 and an AI-dedicated processor 2424. Also, the processor 2420 may be implemented in a form of a system on chip (SoC) in which at least one of the graphic processor 2422 or the AI-dedicated processor 2424 is integrated. The processor 2420 controls overall operations of the image decoding apparatus 2400 and a signal flow between internal components of the image decoding apparatus 2400, and processes data.

The graphic processor 2422 is a processor designed specifically for decoding and post-processing of an image. Accordingly, the graphic processor 2422 may process the image data received by the image decoding apparatus 2400 and efficiently perform a low resolution image reconstruction function of the first decoder 232. The AI-dedicated processor 2424 is a processor designed specifically for AI operation. Accordingly, the AI-dedicated processor 2424 may efficiently perform a low resolution image AI up-scaling function of the AI up-scaler 234.

The image data and the AI data input to the image decoding apparatus 2400 through the communicator 2410 are processed by the processor 2420. A low resolution image may be generated when operations regarding decoding of the image data are performed by the graphic processor 2422. Also, operations regarding AI up-scaling of the low resolution image may be performed by the AI-dedicated processor 2424. Thus, a high resolution image may be generated as the low resolution image is AI up-scaled by the AI-dedicated processor 2424.

The processor 2420 is described to include one graphic processor 2422, but may include one or more graphic processors 2422, according to an embodiment of the disclosure. Also, the processor 2420 is described to include one AI-dedicated processor 2424, but may include one or more AI-dedicated processors 2424, according to an embodiment of the disclosure. Also, the processor 2420 may include one or more general-purpose processors. Additional processes required for AI up-scaling may be performed according to the one or more general-purpose processors. The AI-dedicated processor 2424 may be implemented as a hardware field-programmable gate array (FPGA).

The memory 2430 according to an embodiment of the disclosure may include various types of data, programs, or applications for driving and controlling the image decoding apparatus 2400. The program stored in the memory 2430 may include one or more instructions. Also, the program (one or more instructions) or application stored in the memory 2430 may be executed by the processor 2420. The memory 2430 may store data originated from the communicator 2410 and the processor 2420. Also, the memory 2430 may transmit data required by the processor 2420 to the processor 2420.

The image decoding apparatus 2400 according to an embodiment of the disclosure may perform at least one of functions of the AI decoding apparatus 200 described in FIG. 2 or operations of the image decoding method described in FIG. 22.

Figure 25:
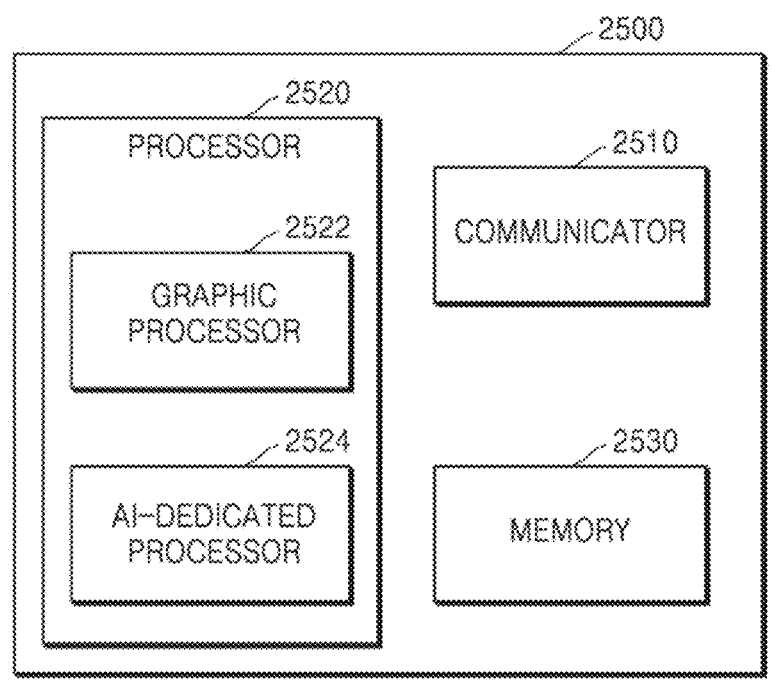
FIG. 25 is a block diagram showing a configuration of an image encoding apparatus, according to the disclosure.

FIG. 25 is a block diagram showing a configuration of an image encoding apparatus, according to an embodiment of the disclosure.

Referring to FIG. 25, an image encoding apparatus 2500 according to an embodiment of the disclosure may include a communicator 2510, a processor 2520, and a memory 2530.

The processor 2520 according to an embodiment of the disclosure may control the image encoding apparatus 2500 in general. The processor 2520 according to an embodiment of the disclosure may execute one or more programs stored in the memory 2530. The processor 2520 may perform functions of the AI down-scaler 612 and the first encoder 614. The processor 2520 may be configured as one or more general-purpose processors.

According to an embodiment of the disclosure, the processor 2520 may include a graphic processor 2522 and an AI-dedicated processor 2524. Also, the processor 2520 may be implemented in a form of an SoC in which at least one of the graphic processor 2522 or the AI-dedicated processor 2524 is integrated. The processor 2520 controls overall operations of the image encoding apparatus 2500 and a signal flow between internal components of the image encoding apparatus 2500, and processes data.

The graphic processor 2522 is a processor designed specifically for encoding and post-processing of an image. Accordingly, the graphic processor 2522 may efficiently perform a low resolution image encoding function of the first encoder 614. The AI-dedicated processor 2524 is a processor designed specifically for AI operation. Accordingly, the AI-dedicated processor 2524 may efficiently perform a high resolution image AI down-scaling function of the AI down-scaler 612. The AI-dedicated processor 2524 may be implemented as a hardware FPGA.

AI down-scaling of the high resolution image and encoding of the low resolution image are performed by the processor 2520. The low resolution image may be generated when operations for AI down-scaling of the high resolution image are performed by the AI-dedicated processor 2524, and AI data required for AI up-scaling of the low resolution image may be generated by the AI-dedicated processor 2524. Image data may be generated when operations for encoding the low resolution image are performed by the graphic processor 2522.

The communicator 2510 may generate a single file of AI encoding data including the AI data and the image data, according to control of the processor 2520. Also, the communicator 2510 may output the single file of the AI encoding data to the outside of the image encoding apparatus 2500, according to control of the processor 2520. Alternatively, the communicator 2510 may generate a file including the AI data and a file including the image data separately, according to control of the processor 2520. Also, the communicator 2510 may output each of the file including the AI data and the file including the image data to the outside of the image encoding apparatus 2500, according to control of the processor 2520.

The processor 2520 is described to include one graphic processor 2522, but may include one or more graphic processors 2522, according to an embodiment of the disclosure. Also, the processor 2520 is described to include one AI-dedicated processor 2524, but may include one or more AI-dedicated processors 2524, according to an embodiment of the disclosure. Also, the processor 2520 may include one or more general-purpose processors. Additional processes required for AI up-scaling may be performed according to the one or more general-purpose processors.

The memory 2530 according to an embodiment of the disclosure may include various types of data, programs, or applications for driving and controlling the image encoding apparatus 2500. The program stored in the memory 2530 may include one or more instructions. Also, the program (one or more instructions) or application stored in the memory 2530 may be executed by the processor 2520. The memory 2530 may store the high resolution image such as the original image 105. The memory 2530 may store data originated from the communicator 2510 and the processor 2520. Also, the memory 2530 may transmit data required by the processor 2520 to the processor 2520.

The image encoding apparatus 2500 according to an embodiment of the disclosure may perform at least one of functions of the AI encoding apparatus 600 described in FIG. 7 or operations of the image encoding method described in FIG. 23.

Meanwhile, the embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

The invention claimed is:

1. A non-transitory computer-recordable recording medium having stored thereon a video file including artificial intelligence (AI) encoding data,
wherein the video file comprises:
a media data box including image data; and
a metadata box including metadata about the image data,
wherein AI data is included in the metadata box,
wherein the AI encoding data comprises:
the image data including encoding information of a down-scaled image generated by AI down-scaling an original image; and
the AI data about AI up-scaling of the down-scaled image reconstructed according to the image data,
wherein the AI data comprises:
AI target data indicating whether the AI up-scaling is or is not to be performed on at least one frame; and
AI supplementary data about up-scaling deep neural network (DNN) setting information used for performing the AI up-scaling of the at least one frame through an up-scaling deep neural network selected from among a plurality of DNNs related to a plurality of DNN setting information that are pre-stored, when the AI up-scaling is performed on the at least one frame.

2. The non-transitory computer-readable recording medium of claim 1, wherein the AI target data comprises at least one of:
video AI target data indicating whether the AI up-scaling is to be performed on a plurality of frames included in the image data;
video segment AI target data indicating whether the AI up-scaling is to be performed on a plurality of frames included in a video segment;
frame group AI target data indicating whether the AI up-scaling is to be performed on a plurality of frames included in a frame group; or
frame AI target data indicating whether the AI up-scaling is to be performed on a current frame.

3. The non-transitory computer-readable recording medium of claim 1, wherein the AI supplementary data comprises at least one of:
video AI supplementary data about at least one piece of up-scaling DNN setting information used to perform the AI up-scaling of all of a plurality of frames included in the image data;
video segment AI supplementary data about at least one piece of up-scaling DNN setting information used to perform the AI up-scaling of the plurality of frames included in a video segment;
frame group AI supplementary data about at least one piece of up-scaling DNN setting information used to perform the AI up-scaling of the plurality of frames included in a frame group; or frame AI supplementary data about up-scaling DNN setting information used to perform the AI up-scaling of a current frame.

4. The non-transitory computer-readable recording medium of claim 3, wherein:

the AI data comprises at least one of:

video segment AI supplementary data dependency information indicating whether video segment AI supplementary data is the same between a current video segment and a consecutive previous video segment, frame group AI supplementary data dependency information indicating whether frame group AI supplementary data is the same between a current frame group and a consecutive previous frame group, or frame AI supplementary data dependency information indicating whether frame AI supplementary data is the same between a current frame and a consecutive previous frame, when the video segment AI supplementary data dependency information indicates that the AI segment AI supplementary data is the same between the current video segment and the consecutive previous video segment, the video segment AI supplementary data about the current video segment is omitted from the AI data, when the frame group AI supplementary data dependency information indicates that the frame group AI supplementary data is the same between the current frame group and the consecutive previous frame group, the frame group AI supplementary data about the current frame group is omitted from the AI data, and when the frame AI supplementary data dependency information indicates that the frame AI supplementary data is the same between the current frame and the consecutive previous frame, the frame AI supplementary data about the current frame is omitted from the AI data.

5. The non-transitory computer-readable recording medium of claim 1, wherein:

the metadata box comprises synchronization data about synchronization of the image data and the AI data, and the AI data is configured to be decoded according to a reproduction order or decoding order of a plurality of frames of the image data, based on the synchronization data.

6. The non-transitory computer-readable recording medium of claim 1, wherein:

the AI data is embedded in the image data, video AI data about the AI up-scaling of the image data is located in the image data to be decoded together with a video encoding parameter performed on all of a plurality of frames of the image data, video segment AI data about the AI up-scaling of a current video segment including a current frame is located in the image data to be decoded together with a video segment encoding parameter on to the plurality of frames of the current video segment, frame group AI data about the AI up-scaling of a current frame group including the current frame is located in the image data to be decoded together with a frame group parameter performed on the plurality of frames of the current frame group, and frame AI data about the AI up-scaling of the current frame is located in the image data to be decoded together with encoding information of the current frame included in the plurality of frames.

7. The non-transitory computer-readable recording medium of claim 6, wherein the image data comprises:

a video header including a video encoding parameter of the image data;

a video segment header including a video segment encoding parameter of the current video segment;

a frame group header including a frame group encoding parameter of the current frame group; and a frame header including encoding information of the current frame, the video AI data is included in the video header or is located immediately before or after the video header, the video segment AI data is included in the video segment header or is located immediately before or after the video segment header, the frame group AI data is included in the frame group header or is located immediately before or after the frame group header, and the frame AI data is included in the frame header or is located immediately before or after the frame header.

8. The non-transitory computer-readable recording medium of claim 1, wherein:

the video file comprises:

a metadata box including metadata about the image data; and a plurality of video segment data boxes in which the AI encoding data is split according to certain times, wherein each of the plurality of video segment data boxes comprises:

a segment media data box including video segment data; and a segment metadata box including metadata about the video segment data, and the AI data comprises video AI data used to perform the AI up-scaling of all frames of the image data and video segment AI data used to perform the AI up-scaling of all frames of a video segment, and wherein the video AI data is included in the metadata box and the video segment AI data is included in the segment metadata box.

9. The non-transitory computer-readable recording medium of claim 1, wherein the AI supplementary data comprises at least one of:

channel information indicating a color channel to which the AI up-scaling is performed;

target bitrate information indicating a bitrate of the down-scaled image; or resolution information related to resolution of the AI up-scaled image or the original image.

10. A method of displaying an image by an electronic device configured to use an artificial intelligence (AI), the method comprising:

receiving a video file including AI encoding data that includes image data and AI data about AI up-scaling of the image data which includes AI target data indicating whether the AI up-scaling is or is not to be performed on at least one frame;

obtaining the AI data of the AI encoding data from a metadata box of the video file and obtaining the image data of the AI encoding data from a media data box of the video file;

reconstructing a down-scaled image of at least one frame by decoding the image data;

obtaining up-scaling deep neural network (DNN) setting information of the at least one frame used to perform the AI up-scaling of at least one frame through an up-scaling deep neural network selected from among a plurality of up-scaling DNNs related to a plurality of up-scaling DNN setting information that are pre-stored, when the AI up-scaling is performed on the at least one frames from the AI data; and generating a AI up-scaled image corresponding to the down-scaled image by performing the AI up-scaling of the down-scaled image through the selected up-scaling deep neural network; and providing on a display of the electronic device, the AI up-scaled image.

11. The method of claim 10, wherein the AI data comprises at least one of frame AI data about the AI up-scaling of a current frame included in the at least one frame, frame group AI data about the AI up-scaling of a frame group including the at least one frame, video segment AI data about the AI up-scaling of a video segment including the at least one frame, or video AI data about the AI up-scaling of a video including the at least one frame.

12. The method of claim 10, wherein
the AI data further comprises:
AI supplementary data about up-scaling DNN setting information used to AI up-scale the at least one frame,
wherein the obtaining of the up-scaling DNN setting information comprises:
identifying whether the AI up-scaling is performed won the at least one frame, according to the AI target data; and
obtaining at least one piece of up-scaling DNN setting information used to perform the AI up-scaling on the at least one frame, according to the AI supplementary data, when it is identified that the AI up-scaling is performed on the at least one frame.

13. The method of claim 10, wherein:
the AI data comprises at least one of target bitrate information indicating a bitrate of the down-scaled image or resolution information related to resolution of the AI up-scaled image or the original image, and
the obtaining of the up-scaling DNN setting information comprises obtaining two or more pieces of up-scaling DNN setting information of the at least one frame from a plurality of pieces of default up-scaling DNN setting information, according to at least one of the target bitrate information or the resolution information.

14. The method of claim 10, wherein:
the metadata box of the video file comprises synchronization data about synchronization of the image data and the AI data, and
the obtaining of the AI data comprises obtaining the AI data corresponding to the at least one frame according to an encoding order or reproduction order of the image data and the AI data indicated by the synchronization data.

15. An electronic device for displaying an image by using an artificial intelligence (AI), the electronic device comprising:
a display; and
one or more processors configured to execute the one or more instructions stored in the electronic device to:
receive a video file including AI encoding data that includes image data and AI data about AI up-scaling of the image data which includes AI target data indicating whether the AI up-scaling is or is not to be performed on at least one frame,
obtain the AI data of the AI encoding data from a metadata box of the video file and obtain the image data of the AI encoding data from a media data box of the video file,
reconstruct a down-scaled image of at least one frame by decoding the image data,
obtain up-scaling deep neural network (DNN) setting information of the at least one frame used to perform the AI up-scaling on at least one frame through an up-scaling deep neural network selected from among a plurality of DNNs related to a plurality of up-scaling DNN setting information that are pre-stored, when the AI up-scaling is performed on the at least one frames from the AI data,
generate a AI up-scaled image corresponding to the down-scaled image by performing the AI up-scaling of the down-scaled image through the selected up-scaling deep neural network, and
provide on the display of the electronic device, the AI up-scaled image.

* * * * *

UNITED STATES PATENT AND TRADEMARK OFFICE
CERTIFICATE OF CORRECTION

PATENT NO. : 10,819,992 B2  
APPLICATION NO. : 16/743613  
DATED : October 27, 2020  
INVENTOR(S) : Pilkyu Park et al.

Page 1 of 1

It is certified that error appears in the above-identified patent and that said Letters Patent is hereby corrected as shown below:

In the Claims

In Claim 1, Column 58, Line 31, after "is", insert --to be performed--;

In Claim 1, Column 58, Line 31, after "or", insert --the AI up-scaling--;

In Claim 10, Column 60, Line 60, after "is", insert --to be performed--;

In Claim 10, Column 60, Line 60, after "or", insert --the AI up-scaling--;

In Claim 10, Column 61, Line 1, after "obtaining", insert --, from the AI data,--;

In Claim 10, Column 61, Line 8, after "frames", delete "from the AI data";

In Claim 12, Column 61, Line 30, change "won" to "on";

In Claim 15, Column 62, Line 22, after "is", insert --to be performed--;

In Claim 15, Column 62, Line 22, after "or", insert --the AI up-scaling--;

In Claim 15, Column 62, Line 30, after "obtain", insert --, from the AI data,--; and In Claim 15, Column 62, Line 37, after "frames", delete "from the AI data".

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*